United States Patent
Uchida

(10) Patent No.: US 11,140,728 B2
(45) Date of Patent: Oct. 5, 2021

(54) CONTROL METHOD AND INFORMATION PROCESSING APPARATUS

(71) Applicant: CANON KABUSHIKI KAISHA, Tokyo (JP)

(72) Inventor: Yusuke Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/801,363

(22) Filed: Feb. 26, 2020

(65) Prior Publication Data
US 2020/0288514 A1 Sep. 10, 2020

(30) Foreign Application Priority Data

Mar. 5, 2019 (JP) .............................. JP2019-039811

(51) Int. Cl.
| | |
|---|---|
| *H04W 4/00* | (2018.01) |
| *H04W 76/11* | (2018.01) |
| *H04W 76/14* | (2018.01) |
| *H04W 4/80* | (2018.01) |
| *H04W 48/18* | (2009.01) |
| *H04W 48/08* | (2009.01) |

(52) U.S. Cl.
CPC .............. *H04W 76/11* (2018.02); *H04W 4/80* (2018.02); *H04W 48/08* (2013.01); *H04W 48/18* (2013.01); *H04W 76/14* (2018.02)

(58) Field of Classification Search
CPC ....... H04W 76/11; H04W 76/14; H04W 4/80; H04W 48/18; H04W 48/08; H04W 76/02; H04W 8/005; H04W 84/12; H04W 48/16; H04W 88/08

USPC ......................................................... 370/329
See application file for complete search history.

(56) References Cited

U.S. PATENT DOCUMENTS

| | | | | |
|---|---|---|---|---|
| 9,999,077 | B2* | 6/2018 | Sumiuchi .............. | H04W 48/16 |
| 10,244,563 | B2* | 3/2019 | Sumiuchi .............. | H04W 48/16 |
| 10,306,453 | B2* | 5/2019 | Moriya ................. | H04W 76/15 |
| 10,489,173 | B2* | 11/2019 | Sumiuchi .......... | H04M 1/72409 |
| 10,701,742 | B2* | 6/2020 | Sumiuchi ................ | H04W 4/20 |
| 10,979,581 | B2* | 4/2021 | Okamoto .............. | G06F 3/1204 |
| 2005/0233743 | A1* | 10/2005 | Karaoguz ........... | H04L 65/1073 |
| | | | | 455/432.3 |

(Continued)

FOREIGN PATENT DOCUMENTS

JP 2017-188869 A 10/2017

*Primary Examiner* — Marceau Milord
(74) *Attorney, Agent, or Firm* — Venable LLP

(57) ABSTRACT

A control method of performing communication using a first and second communication method includes searching for, by the first and second communication method, a communication apparatus, and receiving a selection of the communication apparatus discovered by the first and second communication method, as a target. If the target discovered by the first communication method is selected, first setting information is transmitted to cause the target to establish connection by the first communication method to the target, and second setting information is transmitted to cause the target to establish connection by the second communication method to the target. If the target discovered by the second communication method is selected, the second setting information is transmitted to the target by the second communication method, and the first setting information is transmitted to the target.

20 Claims, 11 Drawing Sheets

(56) References Cited

U.S. PATENT DOCUMENTS

| | | | |
|---|---|---|---|
| 2010/0232408 A1* | 9/2010 | Lim | H04W 76/14 |
| | | | 370/338 |
| 2013/0281021 A1* | 10/2013 | Palin | H04W 8/005 |
| | | | 455/41.2 |
| 2014/0368878 A1* | 12/2014 | Asai | H04N 1/0044 |
| | | | 358/1.15 |
| 2015/0067819 A1* | 3/2015 | Shribman | H04L 67/2838 |
| | | | 726/12 |
| 2016/0198403 A1* | 7/2016 | Sumiuchi | H04W 8/005 |
| | | | 455/434 |
| 2016/0198498 A1* | 7/2016 | Wada | H04W 4/80 |
| | | | 370/338 |
| 2016/0323744 A1* | 11/2016 | Yang | H04W 12/062 |
| 2016/0360349 A1* | 12/2016 | Goto | H04W 76/18 |
| 2017/0006166 A1* | 1/2017 | Sumiuchi | H04W 76/11 |
| 2017/0339132 A1* | 11/2017 | Araki | H04W 12/03 |
| 2018/0132305 A1* | 5/2018 | Sumiuchi | H04W 76/34 |
| 2018/0146113 A1* | 5/2018 | Takahashi | H04L 67/16 |
| 2019/0050175 A1* | 2/2019 | Moriya | G06F 3/1254 |
| 2019/0200399 A1 | 6/2019 | Sumiuchi et al. | |
| 2019/0349449 A1* | 11/2019 | Shribman | H04L 63/029 |
| 2020/0344084 A1* | 10/2020 | Shribman | H04L 61/1511 |
| 2021/0029080 A1* | 1/2021 | Shribman | H04L 67/2838 |

\* cited by examiner

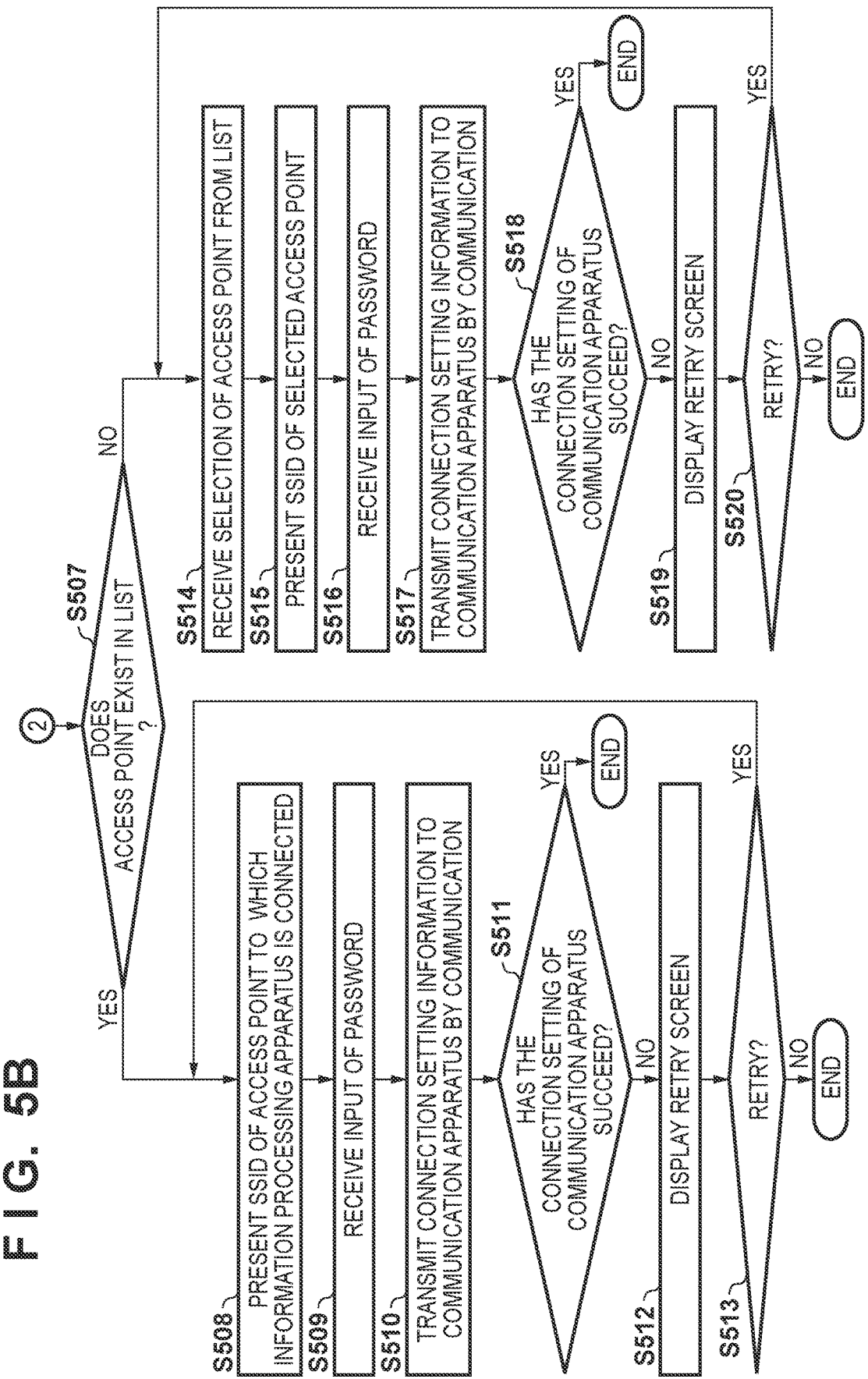

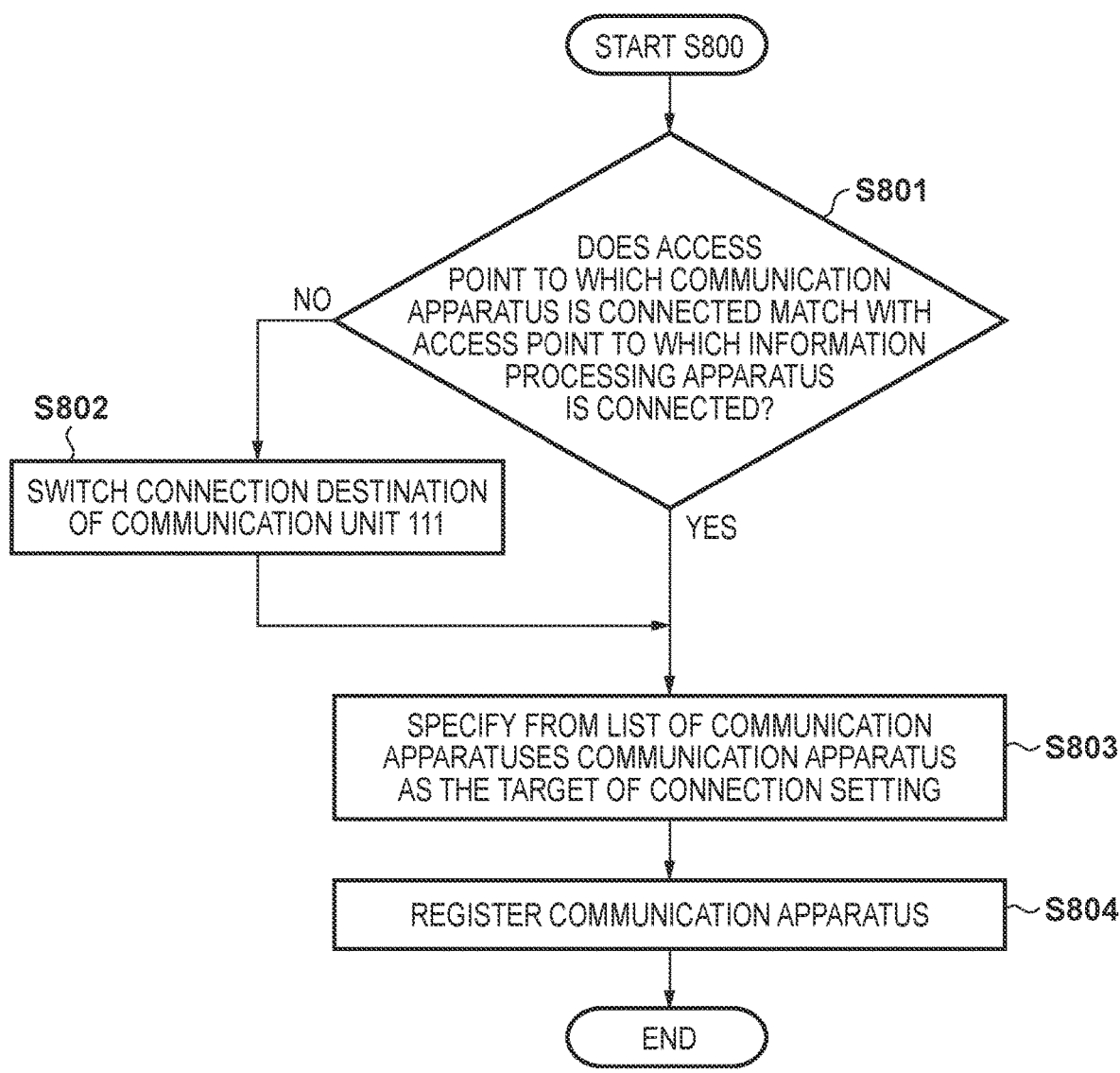

CONTROL METHOD AND INFORMATION PROCESSING APPARATUS

BACKGROUND OF THE INVENTION

Field of the Invention

The present invention relates to a control method and an information processing apparatus.

Description of the Related Art

As a method of connecting an information processing apparatus such as a smartphone to a communication apparatus such as a networking printer by a communication method such as Wi-Fi, a method of connecting them via an access point outside the communication apparatus, such as a wireless LAN router, is used. This connection method is called infrastructure connection. When the information processing apparatus and the communication apparatus establish infrastructure connection via an access point, the information processing apparatus can execute bidirectional communication to perform connection setting processing of the communication apparatus or can use a Web service by connecting to the Internet.

There is also a method in which an information processing apparatus is connected to a communication apparatus using a communication method such as Bluetooth Low Energy (BLE) and performs bidirectional communication to perform connection setting processing of the communication apparatus. Japanese Patent Laid-Open No. 2017-188869 describes an apparatus that switches the communication method used to execute connection setting processing in accordance with which communication method has been used to detect a communication apparatus selected as a target to perform connection setting processing.

As communication apparatuses capable of communicating using a plurality of communication methods such as Wi-Fi and BLE have become widespread, there is demand for improved user convenience in setting processing for causing a communication apparatus to establish a plurality of connections by a plurality of communication methods.

SUMMARY OF THE INVENTION

An aspect of the present invention is to eliminate the above-mentioned problem with conventional technology.

A feature of the present invention is to provide a technique of improving user convenience in setting processing for causing a communication apparatus to establish a plurality of connections by a plurality of communication methods.

According to a first aspect of the present invention, there is provided a control method of a computer of an information processing apparatus capable of performing communication using a first communication method and a second communication method in which a communicable distance is shorter than in the first communication method, comprising: searching for, by the first communication method, at least one communication apparatus capable of executing communication by the first communication method; searching for, by the second communication method, the at least one communication apparatus capable of executing communication by the second communication method; receiving a selection operation of selecting, as the communication apparatus of a connection setting target, one of the at least one communication apparatus discovered by the search using the first communication method and the at least one communication apparatus discovered by the search using the second communication method; and if the communication apparatus of the connection setting target is selected by the selection operation from the at least one communication apparatus discovered by the search using the first communication method, transmitting first setting information used to cause the communication apparatus of the connection setting target to establish connection by the first communication method to the communication apparatus of the connection setting target by the first communication method, and based on the transmission of the first setting information, transmitting second setting information used to cause the communication apparatus of the connection setting target to establish connection by the second communication method to the communication apparatus of the connection setting target, and if the communication apparatus of the connection setting target is selected by the selection operation from the at least one communication apparatus discovered by the search using the second communication method, transmitting the second setting information to the communication apparatus of the connection setting target by the second communication method, and based on the transmission of the second setting information, transmitting the first setting information to the communication apparatus of the connection setting target.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are flowcharts showing an example of Wi-Fi connection setting processing executed by the information processing apparatus according to the embodiment;

FIG. 8 is a flowchart showing an example of registration processing executed by the information processing apparatus according to the embodiment.

DESCRIPTION OF THE EMBODIMENTS

Figure 1:
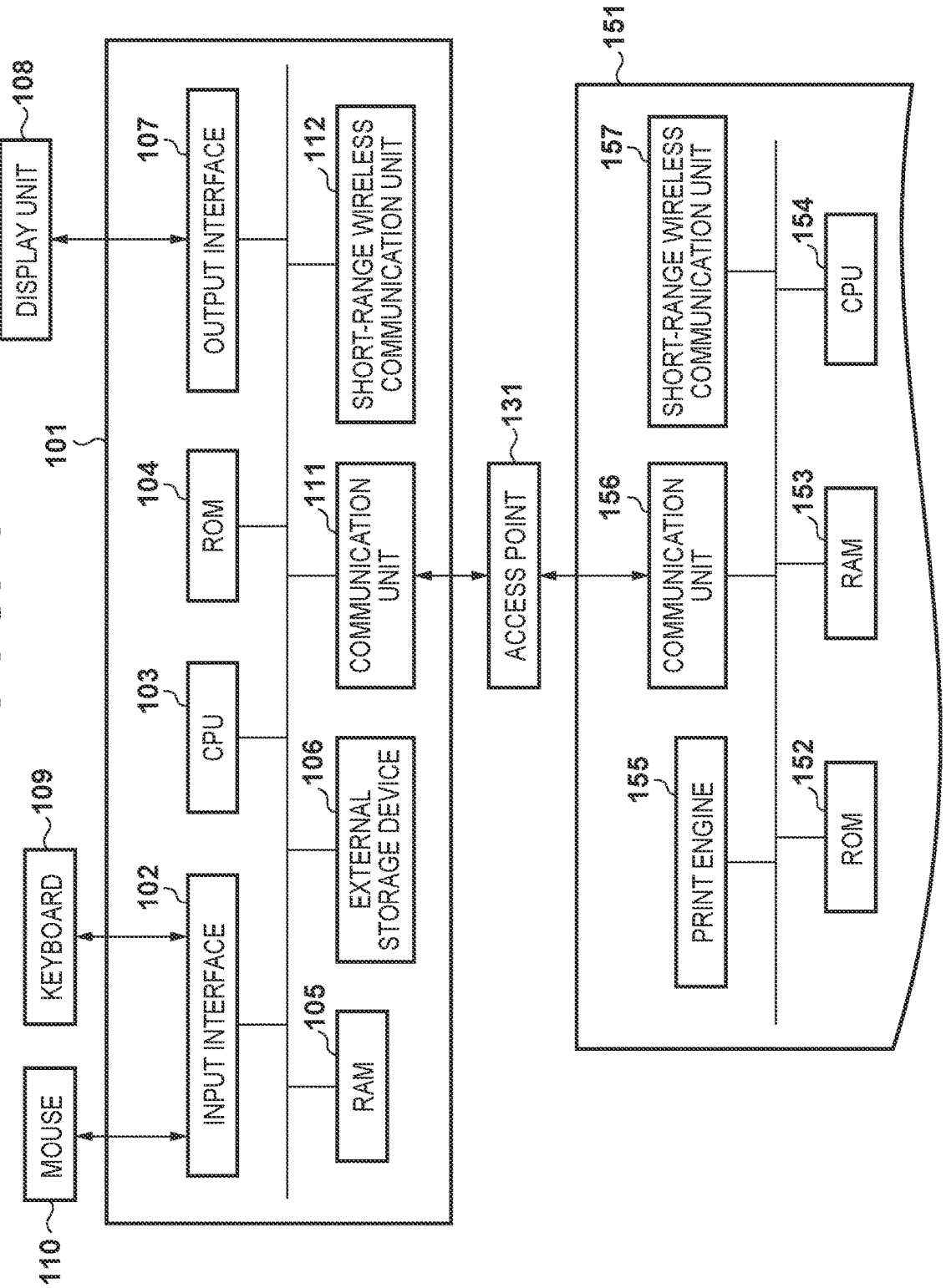
FIG. 1 is a block diagram showing the arrangements of an information processing apparatus and a communication apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An information processing apparatus according to this embodiment and a communication apparatus capable of communicating with the information processing apparatus will be described with reference to FIG. 1. In this embodiment, the information processing apparatus will be explained by exemplifying a smartphone. However, the present invention is not limited to this, and the information processing apparatus includes a portable terminal, a notebook PC, a tablet terminal, a PDA (Personal Digital Assistant), a digital camera, and the like. Additionally, in this embodiment, the communication apparatus will be explained by exemplifying a printer. However, the present invention is not limited to this, and the communication apparatus includes an arbitrary apparatus capable of performing wireless communication with the information processing apparatus. For example, as a printer, the communication apparatus can be applied to an inkjet printer, a full-color laser beam printer, a monochrome printer, and the like. The communication apparatus can be applied not only to a printer but also to a copying machine, a facsimile apparatus, a portable terminal, a smartphone, a notebook PC, a tablet terminal, a PDA, a digital camera, a music reproduction device, a television, a smart speaker, and the like. The communication apparatus can also be applied to a multi-function peripheral device having a plurality of functions such as a copy function, a FAX function, and a print function. In this embodiment, an example of the arrangement of the information processing apparatus will be described with reference to FIG. 1. However, this embodiment can be applied to an apparatus capable of communicating with the communication apparatus. Functions or components are not limited, and functions or components may be added or changed.

An information processing apparatus 101 is an information processing apparatus according to this embodiment. The information processing apparatus 101 includes an input interface (I/F) 102, a CPU 103, a ROM 104, a RAM 105, an external storage device 106, an output I/F 107, a display unit 108, a communication unit 111, and a short-range wireless communication unit 112. The computer of the information processing apparatus 101 is formed by the CPU 103, the ROM 104, the RAM 105, and the like.

The input interface 102 is an interface configured to receive data input or an operation from a user via a mouse 110 or a keyboard 109 connected to the input interface 102.

The CPU 103 is a system control unit and controls the entire information processing apparatus 101. The ROM 104 stores data such as control programs to be executed by the CPU 103, data tables, an embedded operating system (to be referred to as an OS hereinafter), and programs. When the control programs stored in the ROM 104 are executed by the CPU 103, software execution control such as scheduling, task switch, and interrupt processing can be performed under the management of the embedded OS.

The RAM 105 is formed by an SRAM (Static Random Access Memory) or the like, which needs a backup power supply. Note that since the RAM 105 holds data by a primary battery (not shown) for data backup, important data such as program control variables can be stored without volatilizing. In addition, a memory area to store the setting information of the information processing apparatus 101, the management data of the information processing apparatus 101, and the like is also provided in the RAM 105. The RAM 105 is also used as the main memory and the work memory of the CPU 103.

The external storage device 106 stores an application that provides a print execution function, a print information generation program configured to generate print information interpretable by a communication apparatus 151, and the like. The external storage device 106 also stores various kinds of programs such as an information transmission/reception control program configured to transmit/receive information to/from the communication apparatus 151 connected via the communication unit 111, and various kinds of information to be used by these programs.

The output I/F 107 is an interface used by the display unit 108 to display data or make a notification of the state of the information processing apparatus 101.

The display unit 108 is formed from an LED (Light Emitting Diode), an LCD (Liquid Crystal Display), or the like, and displays data or makes a notification of the state of the information processing apparatus 101. Note that operation portions such as a numerical value input key, a mode setting key, a decision key, a cancel key, and a power key may be installed as software or hardware on the display unit 108 to receive input from the user via the display unit 108.

The communication unit 111 is a component connected to an apparatus such as the communication apparatus 151 or an access point 131 to perform data communication. For example, the communication unit 111 can be connected to an access point (not shown) in the communication apparatus 151. When the communication unit 111 and the access point in the communication apparatus 151 are connected, the information processing apparatus 101 and the communication apparatus 151 can communicate with each other. Note that the communication unit 111 may directly communicate with the communication apparatus 151 by wireless communication, or may perform communication via an external apparatus existing outside the information processing apparatus 101 or the communication apparatus 151. Note that the external apparatus includes an external access point (the access point 131 or the like) existing outside the information processing apparatus 101 or outside the communication apparatus 151 and an apparatus other than an access point, which can relay communication. As the wireless communication method, for example, Wi-Fi (Wireless Fidelity)®, Bluetooth®, and the like can be used. In addition, as the access point 131, for example, a device such as a wireless LAN router can be used. Note that in this embodiment, the method of connecting the information processing apparatus 101 and the communication apparatus 151 directly without an intervention of an external access point will be referred to as a direct connection method. Note that in the direct connection method, the information processing apparatus 101 may be connected to the communication apparatus 151 by Wi-Fi Direct. In this case, for example, the communication apparatus 151 operates as a Group Owner in the Wi-Fi Direct standard. In addition, the method of connecting the information processing apparatus 101 and the communication apparatus 151 via an external access point will be referred to as an infrastructure connection method.

The short-range wireless communication unit 112 is a module to be wirelessly connected to an apparatus such as the communication apparatus 151 in a short range to execute data communication, and performs communication by a communication method different from the communication unit 111. The short-range wireless communication unit 112 can be connected to, for example, a short-range wireless communication unit 157 in the communication apparatus 151. As the communication method, for example, Bluetooth Classic®, Bluetooth Low Energy®, (to be referred to as BLE hereinafter), WiFi Aware, and the like can be used. The information processing apparatus 101 may include a plurality of short-range wireless communication units 112.

The communication apparatus 151 includes a ROM 152, a RAM 153, a CPU 154, a print engine 155, a communication unit 156, and the short-range wireless communication unit 157.

The communication unit 156 includes, as an access point in the communication apparatus 151, an access point to be connected to an apparatus such as the information processing apparatus 101. Note that the access point can be connected to the communication unit 111 of the information processing apparatus 101. Note that the communication unit 156 may communicate with the information processing apparatus 101 directly by wireless communication, or may communicate via the access point 131. As the communication method, for example, WiFi®, Bluetooth®, and the like can be used. The communication unit 156 may include hardware functioning as an access point, or may operate as an access point by software that causes the communication unit 156 to function as an access point. In the Wi-Fi Direct standard, the communication unit 156 may operate as a Group Owner.

The short-range wireless communication unit 157 is a component to be wirelessly connected to an apparatus such as the information processing apparatus 101 in a short range, and can be connected to, for example, the short-range wireless communication unit 112 in the information processing apparatus 101. As the communication method, for example, Bluetooth Classic, BLE, WiFi Aware, and the like can be used. The communication apparatus 151 may include a plurality of short-range wireless communication units 157.

Note that in this embodiment, the communication unit 156 can perform communication at a higher speed in a longer range than the short-range wireless communication unit 157. In addition, the short-range wireless communication unit 157 is used to exchange, with an apparatus such as the information processing apparatus 101, communication information used by the communication unit 156 to perform communication.

The RAM 153 is formed by an SRAM or the like, which needs a backup power supply. Note that since the RAM 153 holds data by a primary battery (not shown) for data backup, important data such as program control variables can be stored without volatilizing. In addition, a memory area to store the setting information of the communication apparatus 151, the management data of the communication apparatus 151, and the like is also provided in the RAM 153. The RAM 153 is also used as the main memory and the work memory of the CPU 154, or a reception buffer used to temporarily store print information received from the information processing apparatus 101 or the like, and can store various kinds of information.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152 and executed by the CPU 154.

The CPU 154 is a system control unit and controls the operation of the entire communication apparatus 151.

Based on information stored in the RAM 153 or a print job received from the information processing apparatus 101 or the like, the print engine 155 adds a printing material such as ink to a print medium such as paper, thereby forming an image on the print medium and outputting the print result. Note that when the communication apparatus receives a print job from the information processing apparatus 101, the transmission data amount is large, and high-speed communication is required. Hence, the reception may be done via the communication unit 156 capable of performing communication at a higher speed than the short-range wireless communication unit 157.

Note that a memory such as an external HDD or an SD card may be attached as an optional device to the communication apparatus 151, and the information stored in the communication apparatus 151 may be stored in the memory.

Additionally, for the communication apparatus according to this embodiment, a connection mode is set by connection setting processing to be described later, and the communication apparatus communicates with the information processing apparatus by a connection form based on the set connection mode. In the communication apparatus according to this embodiment, when performing communication by infrastructure connection, an infrastructure connection mode is set as the connection mode. When performing communication by direct connection, a direct connection mode is set as the connection mode. Here, as an example, processing is shared between the information processing apparatus 101 and the communication apparatus 151 as described above. However, the sharing form is not particularly limited to this, and any other form is also possible.

In this embodiment, processing (connection setting processing) of registering an access point to be used for infrastructure connection in the communication apparatus 151 by the information processing apparatus 101 when the information processing apparatus 101 and the communication apparatus 151 establish communication by infrastructure connection will be described. In this embodiment, a description will be made assuming that the information processing apparatus 101 is connected to the access point 131, and the access point 131 is to be registered in the communication apparatus 151 as an access point to be used for infrastructure connection. Additionally, in this embodiment, a description will be made assuming that the short-range wireless communication unit 112 and the short-range wireless communication unit 157 perform communication by BLE. Note that in this embodiment, the short-range wireless communication unit 157 functions as an advertiser (or a slave) that broadcasts advertisement information for direct connection. In addition, the short-range wireless communication unit 112 functions as a scanner (or a master) that receives the advertisement information for the direct connection mode. Furthermore, a description will be made assuming that the communication unit 111 and the communication unit 156 perform communication by a wireless LAN (Wi-Fi). Additionally, a description will be made assuming that the information processing apparatus 101 is connected to the access point 131 in advance, and connection setting processing is stared in a state in which the communication apparatus 151 is not connected to the access point 131.

In this embodiment, processing in a case in which pairing processing (authentication processing) for performing authentication between the information processing apparatus 101 and the communication apparatus 151 and executing data read/write by GATT communication between the apparatuses will be described. Note that GATT (Generic Attribute Profile) is a profile that controls information read/write (transmission/reception) in the BLE standard. GATT communication is communication in which the information processing apparatus 101 plays a role of a GATT client, the communication apparatus 151 plays a role of a GATT server, and information read/write is performed from the information processing apparatus 101 to the communication apparatus 151 by a profile of GATT base. In a state in which pairing is not executed between the information processing apparatus 101 and the communication apparatus 151, the communication apparatus 151 does not permit read/write of predetermined information by GATT communication. This can suppress communication performed between the information processing apparatus 101 and the communication apparatus 151, which are not paired, and unintended acquisition of important information held by the communication apparatus 151.

Processing (connection setting processing) of registering the access point of the connection destination of the communication apparatus 151 will be described. The information processing apparatus 101 performs the connection setting processing when a predetermined application stored in the ROM 104, the external storage device 106, or the like is activated. The predetermined application is an application configured to set the access point of the connection destination of the communication apparatus 151 or cause the communication apparatus 151 to print image data, document data, or the like in the information processing apparatus 101, and will be referred to as a print application hereinafter. Note that the print application may have functions other than the function of setting the access point of the connection destination of the communication apparatus 151 and the print function. For example, if the communication apparatus 151 has a scan function, the print application may have a function of causing the communication apparatus 151 to scan a set original, a function of doing other settings of the communication apparatus 151, a function of confirming the state of the communication apparatus 151, and the like.

Figure 2:
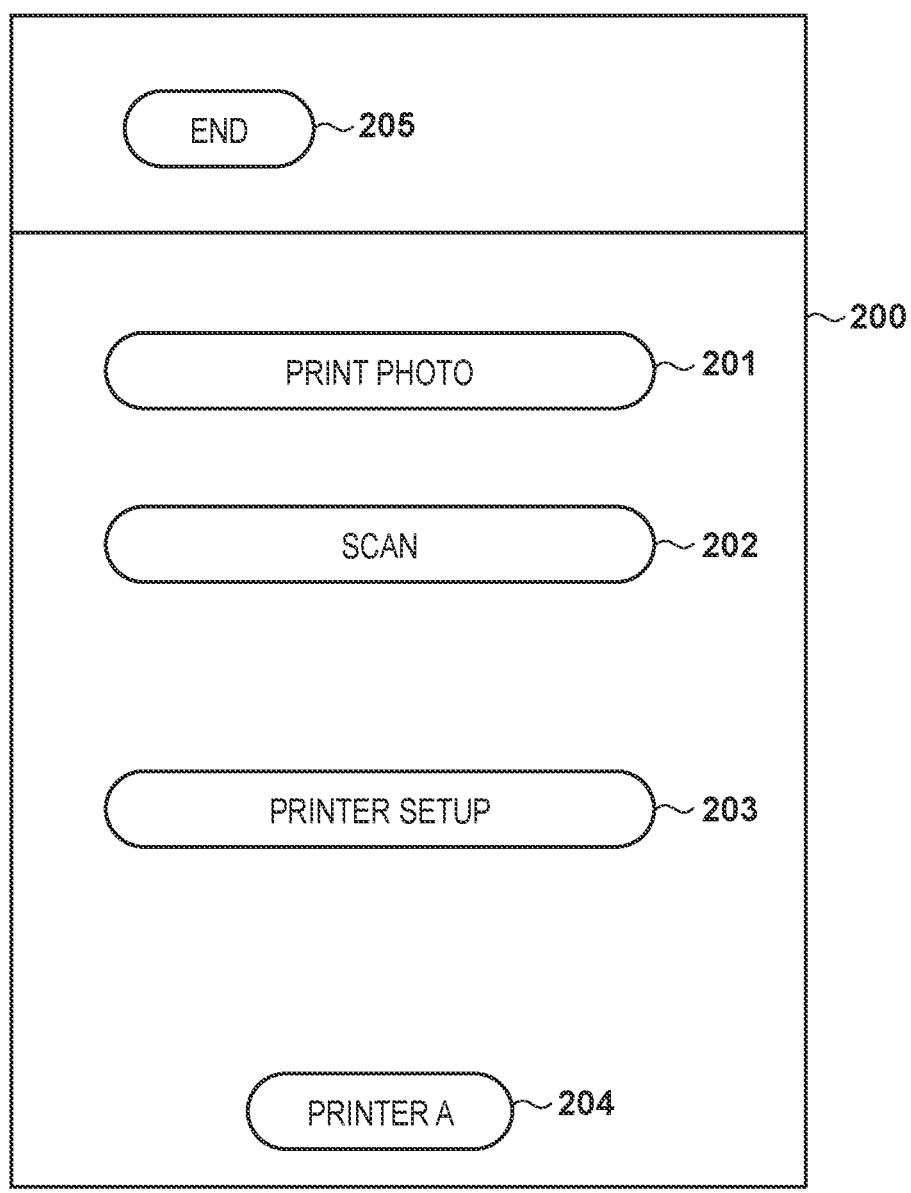
FIG. 2 is a view showing an example of a screen at the time of activation of a print application according to the embodiment.

FIG. 2 shows an example of a screen displayed on the display unit 108 at the time of activation of the print application. The user can use, via an activation screen 200, the functions provided in the communication apparatus such as printing of a desired image and setting of the communication apparatus. Upon detecting pressing of a print button 201, the information processing apparatus 101 starts print processing of causing the communication apparatus 151 to execute printing. In addition, upon detecting pressing of a scan button 202, the information processing apparatus 101 starts scan processing of causing the communication apparatus 151 to execute scan. Furthermore, upon detecting pressing of a printer setup button 203, the information processing apparatus 101 starts searching for a communication apparatus. Note that in this embodiment, to perform connection setting processing for the communication apparatus 151, the communication apparatus 151 needs to be transitioned to a connection setting mode.

The connection setting mode is a mode set in the communication apparatus 151 when setting a connection mode for the communication apparatus 151. If predetermined input from the user is done for an input interface (not shown) of the communication apparatus 151, or at the time of initialization of the communication apparatus 151, the communication apparatus 151 transitions to the connection setting mode. In the connection setting mode, the communication apparatus 151 starts transmitting advertisement information via the short-range wireless communication unit 157. Additionally, in the connection setting mode, the communication apparatus 151 enables an internal access point for the connection setting mode via the communication unit 156 and transitions to a state in which the communication apparatus 151 can directly be connected to the information processing apparatus 101 by Wi-Fi. Note that the timing of starting transmission of advertisement information by the communication apparatus 151 is not limited to the timing at which it transitions to the connection setting mode. For example, it may be the timing of turning on the power supply of the communication apparatus 151, the timing of performing a predetermined operation for enabling the BLE function, or the like. In this case, the connection setting mode need not be set for the communication apparatus 151 to perform connection setting processing for the communication apparatus 151. The communication apparatus 151 may automatically transition to the connection setting mode when activated for the first time, or may enable only a specific wireless communication method of a plurality of wireless communication methods usable at that time. Additionally, in the connection setting mode, not both the BLE and Wi-Fi but only one of them may be enabled.

In this embodiment, in a state in which the communication apparatus 151 operates in the connection setting mode, the information processing apparatus 101 executes connection setting processing using the print application. The connection setting processing according to this embodiment includes setting processing of Wi-Fi connection (to be referred to as Wi-Fi setting processing hereinafter) and setting processing of BLE connection (to be referred to as BLE setting processing hereinafter). That is, in this embodiment, instead of causing the communication apparatus to establish connection by one communication method in accordance with an instruction of connection setting processing based on a user operation, the communication apparatus is caused to establish two connections by two communication methods. Accordingly, the user need not cause the apparatus to execute setting processing for each communication method, and the user convenience is improved.

Note that in this embodiment, the information processing apparatus 101 transmits a print job, a scan job, and the like to the communication apparatus 151 via Wi-Fi connection that can be established by connection setting processing. Additionally, the information processing apparatus 101 acquires the state information of the communication apparatus 151, or executes communication to establish Wi-Fi connection between the information processing apparatus 101 and the communication apparatus 151 via BLE connection that can be established by connection setting processing.

Figure 3A:
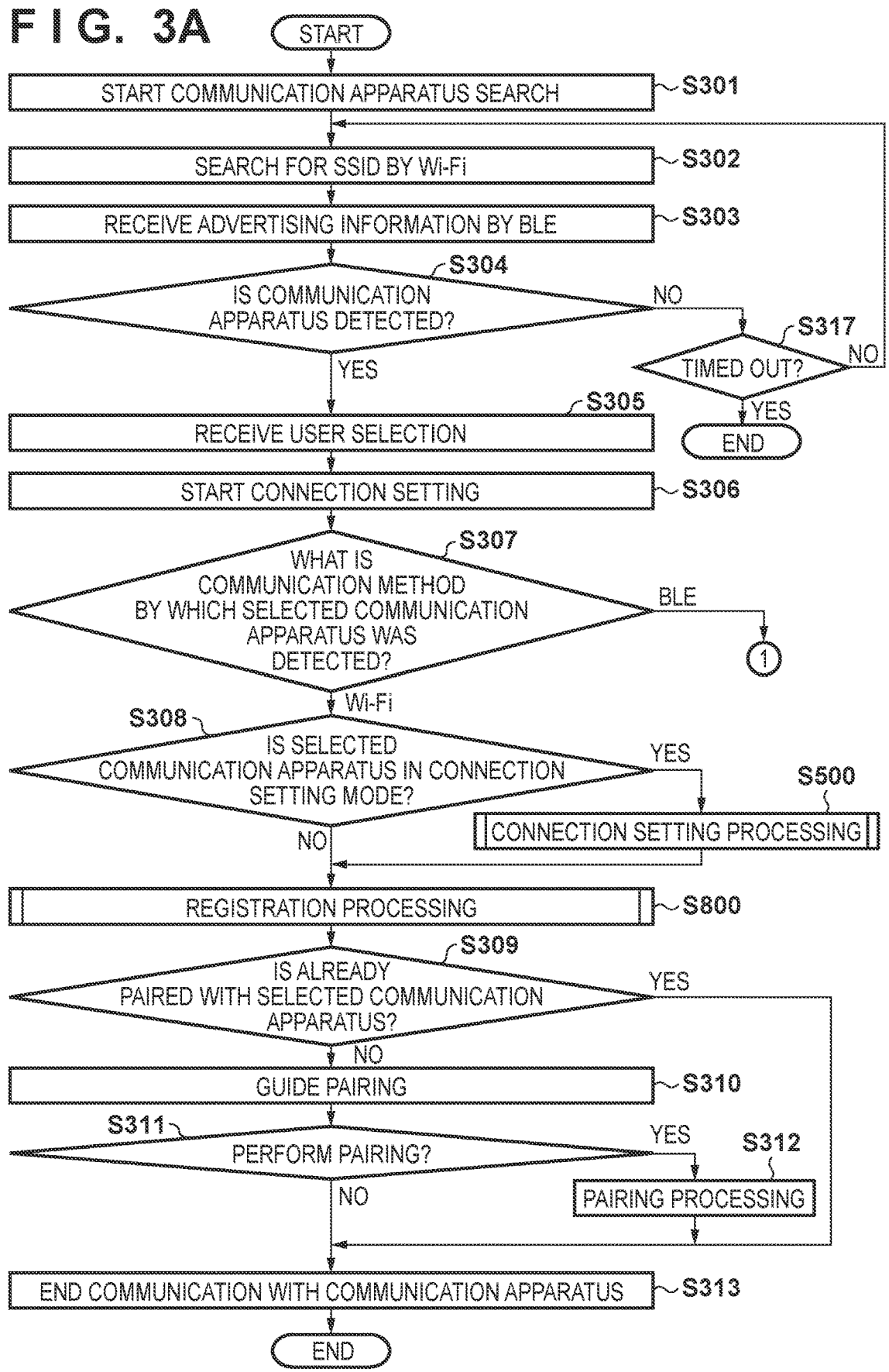
FIGS. 3A and 3B are flowcharts showing an example of connection setting processing executed by the information processing apparatus according to the embodiment.
Figure 3B:
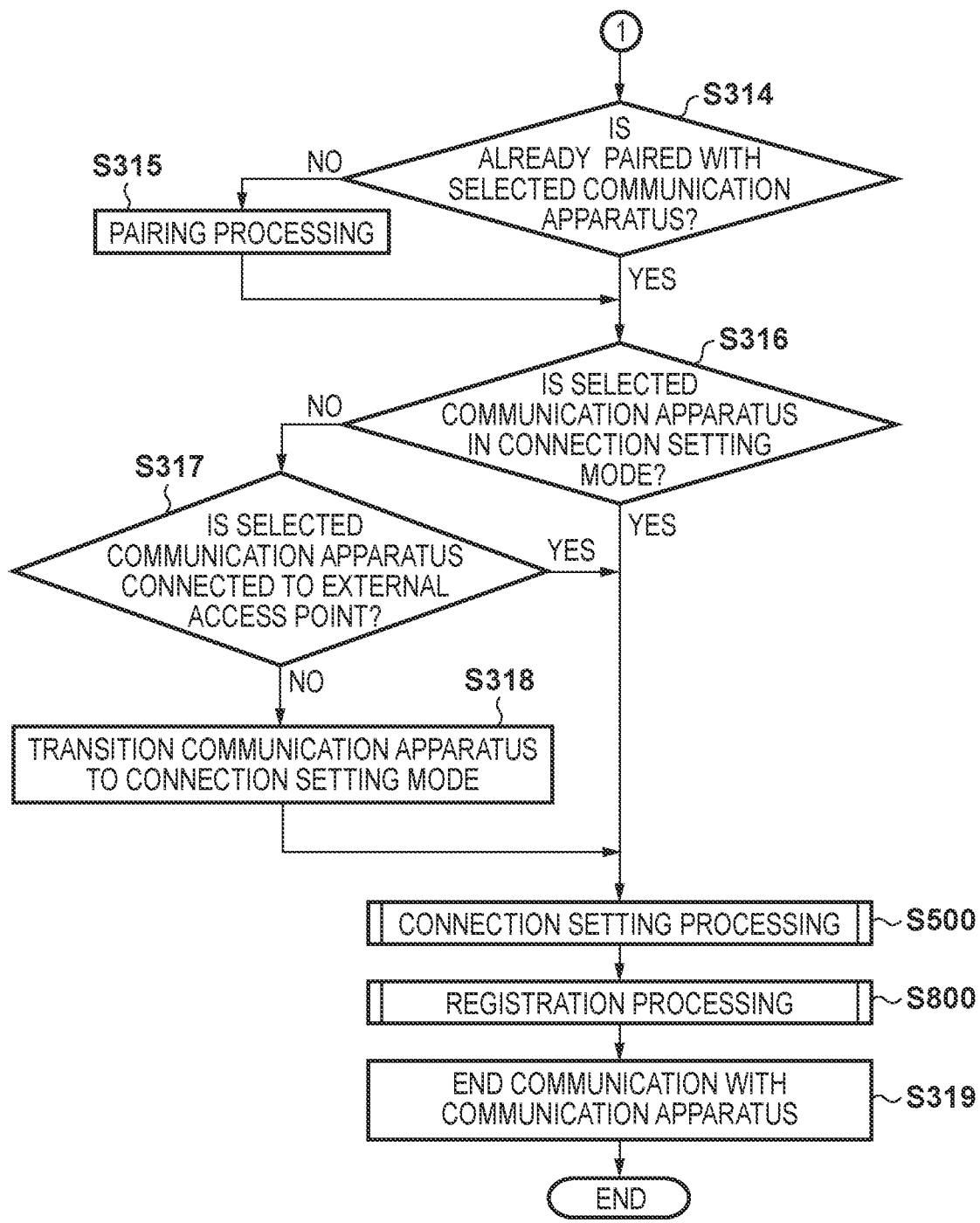

FIGS. 3A and 3B are flowcharts showing the procedure of connection setting processing executed by the information processing apparatus 101. The flowchart shown in FIGS. 3A and 3B are implemented when, for example, the CPU 103 reads out a program stored in the ROM 104, the external storage device 106, or the like to the RAM 105 and executes the program. In addition, the processing shown in the flowcharts of FIGS. 3A and 3B is started when the printer setup button 203 of the information processing apparatus 101 is pressed.

First, in step S301, the CPU 103 detects that execution of connection setting processing is instructed by the user, transitions to a scan state in which advertisement information can be received, and starts searching for the communication apparatus 151.

Next, the CPU 103 advances the process to step S302 to search for the communication apparatus 151 that exists around the information processing apparatus 101 and has enabled Wi-Fi communication. More specifically, the CPU 103 searches for the communication apparatus 151 that belongs to a network formed by an external access point to which the information processing apparatus 101 is Wi-Fi-connected. More specifically, the CPU 103 broadcasts, onto the network formed by the external access point, information used to obtain a response from the communication apparatus 151 corresponding to the print application. The CPU 103 receives a response to the information, thereby discovering the apparatus of the transmission source of the received response. The search method by Wi-Fi will be referred to as an infrastructure search hereinafter. In addition, the CPU 103 executes a known discovery process using Wi-Fi, thereby searching for the communication apparatus 151 operating as an access point. More specifically, the CPU 103 receives a beacon broadcast based on the Wi-Fi standard by the communication apparatus 151 operating as an access point, thereby discovering the apparatus of the transmission source of the received beacon. Note that the CPU 103 may discover only an apparatus corresponding to the print application in apparatuses of the transmission sources of received beacons. The apparatus corresponding to the print application is, for example, the communication apparatus 151 in the connection setting mode. The communication apparatus 151 in the connection setting mode is assumed to have a fixed SSID that the user cannot arbitrarily change. Hence, the CPU 103 specifies a beacon having a fixed SSID in the received beacons, and discovers only the communication apparatus 151 including an internal access point that generates the specified beacon. The above-described search method by Wi-Fi will be referred to as a direct search hereinafter. Note that as the direct search, for example, the communication apparatus 151 that has enabled Wi-Fi Direct may be searched for. That is, in step S302, the information processing apparatus 101 searches for the communication apparatus 151 via the communication unit 156. The identification information (for example, SSID) of the communication apparatus 151 discovered by the search is added to a discovered apparatus list held by the information processing apparatus 101.

Next, the CPU 103 advances the process to step S303 to search for the communication apparatus 151 that exists around the information processing apparatus 101 and has enabled BLE communication. More specifically, the CPU 103 starts receiving advertisement information. If the short-range wireless communication unit 112 receives advertisement information transmitted from the short-range wireless communication unit 157 of the communication apparatus 151, it is determined that the communication apparatus 151 is discovered. More specifically, the CPU 103 determines whether the short-range wireless communication unit 112 has received advertisement information and whether the received advertisement information includes identification information representing the communication apparatus 151. That is, in this processing, a communication apparatus capable of executing connection setting processing (BLE setting processing) via BLE is searched for. In this embodiment, the information processing apparatus 101 is assumed to communicate with a communication apparatus of a model or vendor corresponding to the print application. Hence, if the received advertisement information includes information representing that a print service can be provided or information concerning a model or vendor corresponding to the print application, the CPU 103 determines that the identification information representing the communication apparatus 151 is included. The identification information of the communication apparatus 151 discovered by the search is added to the discovered apparatus list held by the information processing apparatus 101.

That is, in this embodiment, the identification information of the communication apparatus 151 capable of executing BLE communication with the information processing apparatus 101 and the identification information of the communication apparatus 151 capable of executing Wi-Fi communication with the information processing apparatus 101 are displayed in parallel on the discovered apparatus list. The identification information of the communication apparatus 151 capable of executing BLE communication with the information processing apparatus 101 and the identification information of the communication apparatus 151 capable of executing Wi-Fi communication with the information processing apparatus 101 may be displayed on the discovered apparatus list not in parallel. That is, the pieces of identification information may be displayed on different screens.

Note that the communication apparatus 151 added to the discovered apparatus list is not limited to this form. For example, the communication apparatus 151 that is set in the connection setting mode and transmits specific advertisement information may be added to the list. In some cases, the communication apparatus 151 capable of executing BLE communication with the information processing apparatus 101 and the communication apparatus 151 capable of executing Wi-Fi communication with the information processing apparatus 101 are judged to be identical. In this case, only one of the identification information obtained by the search by BLE and the identification information obtained by the search by Wi-Fi may be added to the discovered apparatus list. In one example, in a case in which the communication apparatus 151 is discovered by one of the communication methods, even if the same communication apparatus 151 is discovered later by another communication method, it need not be added to the list.

In this embodiment, the information processing apparatus 101 performs the search of the communication apparatus 151 using Wi-Fi first, and performs the search of the communication apparatus 151 using BLE after that. However, the search of the communication apparatus 151 using BLE may be performed first, or the two search processes may be executed in parallel. Additionally, for example, if only one communication apparatus 151 is added to the discovered apparatus list as a result of discovery of the communication apparatus performed for a predetermined time, the CPU 103 may advance to step S306 without displaying the discovered apparatus list and specify the one communication apparatus 151 as the target apparatus. For example, if no communication apparatus 151 is added to the discovered apparatus list at all as a result of discovery of the communication apparatus 151 performed for a predetermined time, the CPU 103 may display an error screen on the display unit 108 and end the connection setting processing.

Next, the CPU 103 advances the process to step S304 to determine whether the communication apparatus 151 is discovered in at least one of steps S302 and S303. Upon determining that the communication apparatus 151 is discovered (YES in step S304), the CPU 103 advances the process to step S305. Upon determining that the communication apparatus 151 is not discovered (NO in step S304), the CPU 103 advances the process to step S317.

If one or more communication apparatuses 151 are discovered in at least one of steps S302 and S303, the CPU 103 performs the process of step S305. On the other hand, upon determining that the communication apparatus 151 is not discovered in at least one of steps S302 and S303, the CPU 103 performs the process of step S317 to determine whether a predetermined time has elapsed from the start of the search of the communication apparatus 151 (time-out has occurred). Upon determining that time-out has not occurred, the CPU 103 performs the processes of steps S302 and S303 again. On the other hand, upon determining that time-out has occurred, the CPU 103 ends the processing. Note that at this time, the CPU 103 may display, on the display unit 108, a screen to notify the user of the time-out.

In step S305, the CPU 103 displays the discovered apparatus list on the display unit 108, and receives, from the user, selection of a communication apparatus 151 from the discovered apparatus list. The communication apparatus 151 selected at this time is specified as the communication apparatus 151 of the connection setting target.

Figure 4:
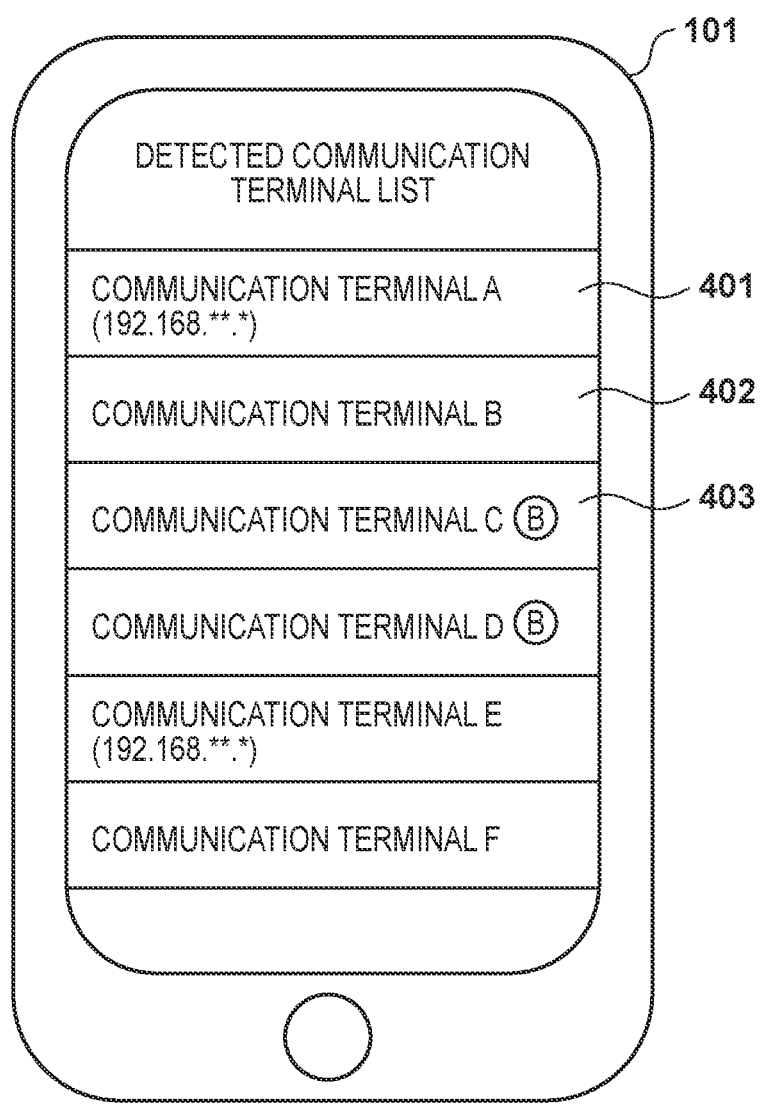
FIG. 4 is a view showing an example of a detected communication terminal list display screen according to the embodiment.

FIG. 4 shows an example of a list screen on which the discovered apparatus list is displayed. Of the communication apparatuses 151 discovered by Wi-Fi, the identification information of the communication apparatus 151 discovered by the infrastructure search is displayed with the IP address of the communication apparatus 151, as in a region 401. The communication apparatus 151 discovered by the direct search is displayed without adding the IP address of the communication apparatus 151, as in a region 402. The identification information of the communication apparatus 151 discovered by BLE is displayed with a mark representing that the communication apparatus is discovered by BLE, as in a region 403. That is, in this embodiment, each communication apparatus 151 is displayed to as to be distinguishable in accordance with the search method. Here, the display format is shown as described above as an example. The form is not particularly limited to this, and any other form may be used as long as the communication apparatus 151 is displayed to be distinguishable in accordance with the search method. Alternatively, the display format need not be changed. Note that the identification information of the communication apparatus 151 may be the name, model number, MAC address, or IP address of the communication apparatus 151, or may be the SSID of the internal access point provided in the communication apparatus 151.

Referring back to FIG. 3A, upon receiving, from the user, a user operation (user input) to select the communication apparatus 151 of the connection setting target in step S305, the CPU 103 advances the process to step S306 to start connection setting processing.

Next, the CPU 103 advances the process to step S307 to determine whether the communication apparatus 151 (the communication apparatus 151 of the connection setting target) selected by the user in step S305 is the communication apparatus 151 discovered by the search using Wi-Fi to the communication apparatus 151 discovered by the search using BLE. Upon determining that the communication apparatus 151 of the connection setting target is discovered by the search using Wi-Fi (Wi-Fi in step S307), the CPU 103 advances the process to step S308. On the other hand, upon determining that the communication apparatus 151 of the connection setting target is discovered by the search using BLE (BLE in step S307), the CPU 103 advances the process to step S314 in FIG. 3B.

In step S308, the CPU 103 determines whether the communication apparatus 151 of the connection setting target selected in step S305 is in the connection setting mode. More specifically, if the communication apparatus 151 of the connection setting target is an apparatus discovered by the direct search, the CPU 103 determines that the communication apparatus 151 of the connection setting target is in the connection setting mode. If the communication apparatus 151 of the connection setting target is an apparatus discovered by the infrastructure search, the CPU 103 determines that the communication apparatus 151 of the connection setting target is not in the connection setting mode. The communication apparatus 151 discovered by the infrastructure search is an apparatus already belonging to the same Wi-Fi network as the information processing apparatus 101 and capable of executing Wi-Fi communication. The determination as described above is performed because the information processing apparatus 101 need not perform the process of step S800 for the communication apparatus 151 discovered by the infrastructure search. Upon determining that the communication apparatus of the connection setting target is in the connection setting mode (YES in step S308), the CPU 103 advances the process to step S500 to perform Wi-Fi setting processing. Upon determining that the communication apparatus of the connection setting target is not in the connection setting mode (NO in step S308), the CPU 103 advances the process to step S800. In step S800, the CPU 103 connects the communication apparatus 151 to the access point by Wi-Fi setting processing, thereby making a preparation for communication with the information processing apparatus 101 by infrastructure connection.

Next, in step S800, to perform communication with the communication apparatus 151 by the print application later, the CPU 103 performs registration processing of registering information concerning the communication apparatus 151 in the print application. By the registration processing, from then on, the print application can execute, for example, job transmission processing including transmission processing of a print job to the communication apparatus 151. Details of the registration processing will be described later.

Next, in the process of step S309, the CPU 103 determines whether the communication apparatus 151 of the connection setting target and the information processing apparatus 101 are paired. Note that this determination is performed based on, for example, information concerning the communication apparatus 151, which is acquired in the registration processing of step S800. Upon determining that the information processing apparatus and the communication apparatus 151 are not paired (NO in step S309), the CPU 103 advances the process to step S310 to confirm whether to execute pairing processing. If the CPU 103 determines that the information processing apparatus 101 is paired with the communication apparatus 151 (YES in step S309), the process advances to step S313. Note that since the communication apparatus selected in step S305 is automatically specified as the communication apparatus 151 of the target of pairing processing, the user need not select the communication apparatus 151 as the target of pairing processing again. In addition, if a specific condition other than the condition that the communication apparatus 151 and the information processing apparatus 101 are not paired is further satisfied, the CPU 103 may confirm whether to execute pairing processing. The specific condition is, for example, whether the method corresponds to a specific pairing method or not or whether it is already confirmed whether to execute pairing processing or not.

In step S310, the CPU 103 displays, on the display unit 108, a screen to confirm with the user whether to perform pairing processing, and receives user selection concerning whether to perform pairing processing. Next, in step S311, the CPU 103 determines whether a user input representing that pairing processing should be performed has been received. Upon determining that a user input representing that pairing processing should be performed has been received (YES in step S311), the CPU 103 advances the process to step S312 to perform pairing processing. Upon determining that a user input representing that pairing processing should not be performed has been received (NO in step S311), the CPU 103 advances the process to step S313.

In step S312, as BLE setting processing, the CPU 103 executes establishment of BLE connection between the information processing apparatus 101 and the communication apparatus 151 of the connection setting target and pairing processing. In one example, the CPU 103 performs Wi-Fi communication with the communication apparatus 151 of the connection setting target at any point of time in steps S308 to S800, thereby acquiring information used to specify the communication apparatus 151 of the connection setting target, for example, a BLE address. That is, the information processing apparatus 101 acquires information used to specify the communication apparatus 151 of the connection setting target in BLE communication via Wi-Fi communication without a user operation. The information used to specify the communication apparatus 151 of the connection setting target in BLE communication may be not the BLE address but, for example, a serial number or a MAC address. Note that at this time, if the BLE communication function of the communication apparatus 151 is not enabled, the CPU 103 may transmit an instruction to enable the BLE communication function of the communication apparatus 151 to the communication apparatus 151 via Wi-Fi connection or the like and then execute the processing.

Details of the pairing processing in step S312 will be described. First, the information processing apparatus 101 starts searching for advertisement information including specific apparatus information. Note that the specific apparatus information is, for example, the UUID or MAC address of an apparatus (a printer or the like) corresponding to the print application. Upon receiving advertisement information including specific apparatus information, the information processing apparatus 101 transmits a BLE connection request (CONNECT_REQ) to the apparatus (here, the communication apparatus 151) that has transmitted the advertisement information, thereby establishing BLE connection between the apparatuses. If pairing with the communication apparatus 151 is not completed, the information processing apparatus 101 displays, on the display unit 108, a screen to promote the user to do pairing. If execution of pairing is instructed by the user, the information processing apparatus 101 transmits a pairing request to the communication apparatus 151 by communication using SMP (Security Manager Protocol) of the BLE standard. Note that the communication between the apparatuses is assumed to be performed by SMP until pairing is ended.

Figure 9B:
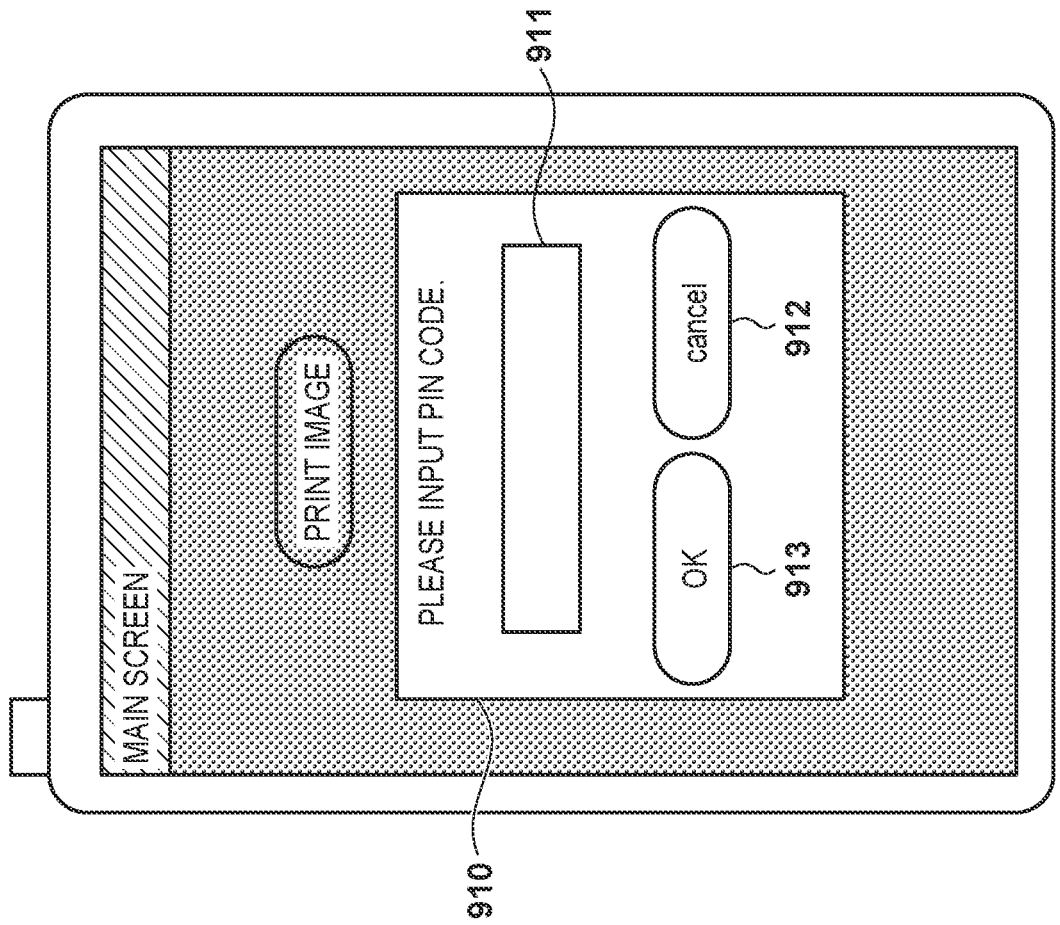
FIGS. 9A and 9B are views showing an example of a screen concerning a PIN code according to the embodiment.
Figure 9A:
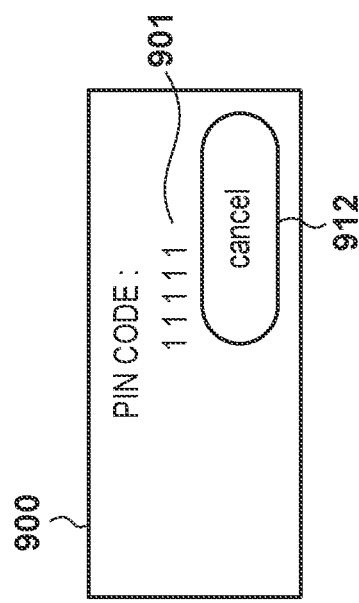

Upon receiving the pairing request, the communication apparatus 151 displays a PIN code display screen 900 as shown in FIG. 9A on a display unit (not shown) provided in the communication apparatus 151. In the PIN code display screen 900, a PIN code 901 and a Cancel button 902 used to cancel the pairing processing are displayed. When the pairing request is transmitted, the information processing apparatus 101 displays a PIN code input screen 910 as shown in FIG. 9B on the display unit 108. In the PIN code input screen 910, a PIN code input region 911, an OK button 913, and a Cancel button 912 are displayed. The PIN code input region 911 is a region used to receive input of the PIN code 901 by the user. The OK button 913 is a button used to transmit the input PIN code 901 to the communication apparatus 151. The Cancel button 912 is a button used to cancel the pairing processing. If the OK button 913 is pressed in a state in which the PIN code 901 is input to the PIN code input region 911, the information processing apparatus 101 transmits information including the input PIN code 901 to the communication apparatus 151. The communication apparatus 151 determines whether the PIN code 901 included in the received information matches the PIN code 901 displayed in the PIN code display screen 900. Upon determining that the PIN codes match, the communication apparatus 151 permits the information processing apparatus 101 to do pairing. More specifically, the communication apparatus 151 transmits a link key created by a predetermined method based on the PIN code 901 to the information processing apparatus 101 using SMP. The link key is thus saved in a storage area (the ROM 104 or the like) provided in the information processing apparatus 101 and a storage area (the ROM 152 or the like) provided in the communication apparatus 151. Pairing is thus completed, and execution of BLE communication between the apparatuses is permitted from then on. Note that when pairing is completed, the information processing apparatus 101 changes the PIN code display screen 900 to a non-display state and displays the original screen again. A form to implement pairing by the PIN code input method has been described above. However, the form is not limited to this. For example, pairing may be implemented by a method without PIN code input, such as the Just Works method or Numeric Comparison method. Additionally, a form in which pairing is implemented by pairing processing based on the BLE standard has been described. However, the form is not limited to this. For example, pairing processing based on a standard unique to the communication apparatus 151 or the vendor of the print application may be executed.

After completion of pairing, when transmitting a GATT communication request to the communication apparatus 151, the information processing apparatus 101 notifies the communication apparatus 151 of the link key saved in the storage area at the time of pairing processing. Upon receiving the GATT communication request, the communication apparatus 151 compares the link key saved in the storage area at the time of pairing processing with the notified link key, thereby confirming whether the apparatus that has generated the GATT communication request is a paired apparatus. If it can be confirmed that the apparatus is a paired apparatus, the communication apparatus 151 starts reading/writing information from/in the information processing apparatus 101 by GATT communication. Accordingly, once pairing processing with the communication apparatus 151 is completed, the information processing apparatus 101 can execute GATT communication with the communication apparatus 151 without inputting the PIN code by the user. Note that a form in which the user is caused to input the PIN code 901 displayed on the PIN code display screen 900 to the PIN code input region 911 has been described above. However, the form is not limited to this. For example, the PIN code 901 may be fixed information (that the user cannot arbitrarily change), and may be stored in the information processing apparatus 101 simultaneously with installation of the print application to be described later. A form in which the communication apparatus 151 is notified of the PIN code 901 without user input can thus be obtained. Alternatively, without inputting a PIN code or fixed information by the user, acquisition of fixed information from the communication apparatus 151 may be enabled for a predetermined period after detection of pressing of a physical key, and the fixed information may be stored in the information processing apparatus 101.

Next, in step S313, the CPU 103 ends the connection setting processing.

Processing from step S314 to be executed in a case in which it is determined in step S307 that the communication apparatus 151 of the connection setting target is discovered by the search using BLE (BLE in step S307) will be described next.

In step S314, it is determined whether the communication apparatus 151 of the connection setting target and the information processing apparatus 101 are paired. Note that this determination is performed based on information concerning the communication apparatus 151, which is acquired in the search using BLE. If the CPU 103 determines that the communication apparatus 151 of the connection setting target and the information processing apparatus 101 are not paired (NO in step S314), the CPU 103 advances the process to step S315 to perform pairing processing similar to step S312 described above. After that, the CPU 103 advances the process to step S316. On the other hand, if the CPU 103 determines that the communication apparatus 151 of the connection setting target and the information processing apparatus 101 are paired (YES in step S314), the process advances to step S316. That is, after BLE setting processing is executed, execution of Wi-Fi setting processing is automatically started.

Next, in step S316, the CPU 103 determines whether the communication apparatus 151 of the connection setting target selected in step S305 is in the connection setting mode. This determination is performed based on information concerning the communication apparatus 151, which is acquired by communication using BLE. If the CPU 103 determines that the communication apparatus 151 of the connection setting target is not in the connection setting mode (NO in step S316), the process advances to step S317. If the CPU 103 determines that the communication apparatus 151 of the connection setting target is in the connection setting mode (YES in step S316), the process advances to step S500.

In step S317, the CPU 103 determines whether the communication apparatus 151 of the connection setting target belongs to a network formed by an external access point to which the information processing apparatus 101 is Wi-Fi-connected. More specifically, the CPU 103 broadcasts, onto the network formed by the external access point, information (for example, the identification information of the communication apparatus 151 of the connection setting target) used to obtain a response from the communication apparatus 151 of the connection setting target. If a response can be obtained, the CPU 103 determines that the communication apparatus 151 of the connection setting target belongs to the network. If a response cannot be obtained, the CPU 103 determines that the communication apparatus 151 of the connection setting target does not belong to the network. If the CPU 103 determines that the communication apparatus 151 of the connection setting target belongs to the network (YES in step S317), the process advances to step S800. If the CPU 103 determines that the communication apparatus 151 of the connection setting target does not belong to the network (NO in step S317), the process advances to step S318.

In step S318, the CPU 103 transmits information used to make the communication apparatus 151 of the connection setting target transition to the connection setting mode to the communication apparatus 151 via BLE connection. The communication apparatus 151 thus transitions to the connection setting mode.

After that, the CPU 103 performs the same Wi-Fi setting processing as described above in step S500, performs the same registration processing as described above in step S800, and ends the connection setting processing in step S319.

As described above, the information processing apparatus according to this embodiment can execute Wi-Fi setting processing and BLE setting processing continuously in an appropriate order in accordance with the communication method used to detect the communication apparatus selected by the user and execute a plurality of connection settings including a communication method that is not selected by the user. In other words, after execution of Wi-Fi setting processing, the information processing apparatus performs BLE setting processing for the apparatus as the target of Wi-Fi setting processing without receiving a selection operation of the apparatus (the apparatus of the transmission destination of the information for BLE setting processing) as the target of BLE setting processing from the user. In addition, after execution of BLE setting processing, the information processing apparatus performs Wi-Fi setting processing for the apparatus as the target of BLE setting processing without receiving a selection operation of the apparatus (the apparatus of the transmission destination of the information for Wi-Fi setting processing) as the target of Wi-Fi setting processing from the user. With this form, the user need not select the apparatus as the target of setting processing every time setting processing is executed, and the user convenience improves. Note that in this embodiment, the communication apparatus having two types of communication methods, that is, Wi-Fi and BLE, has been described. An arrangement of a communication apparatus having another short-range wireless communication method or an arrangement of a communication apparatus having three or more types of communication methods may be used.

Figure 5A:
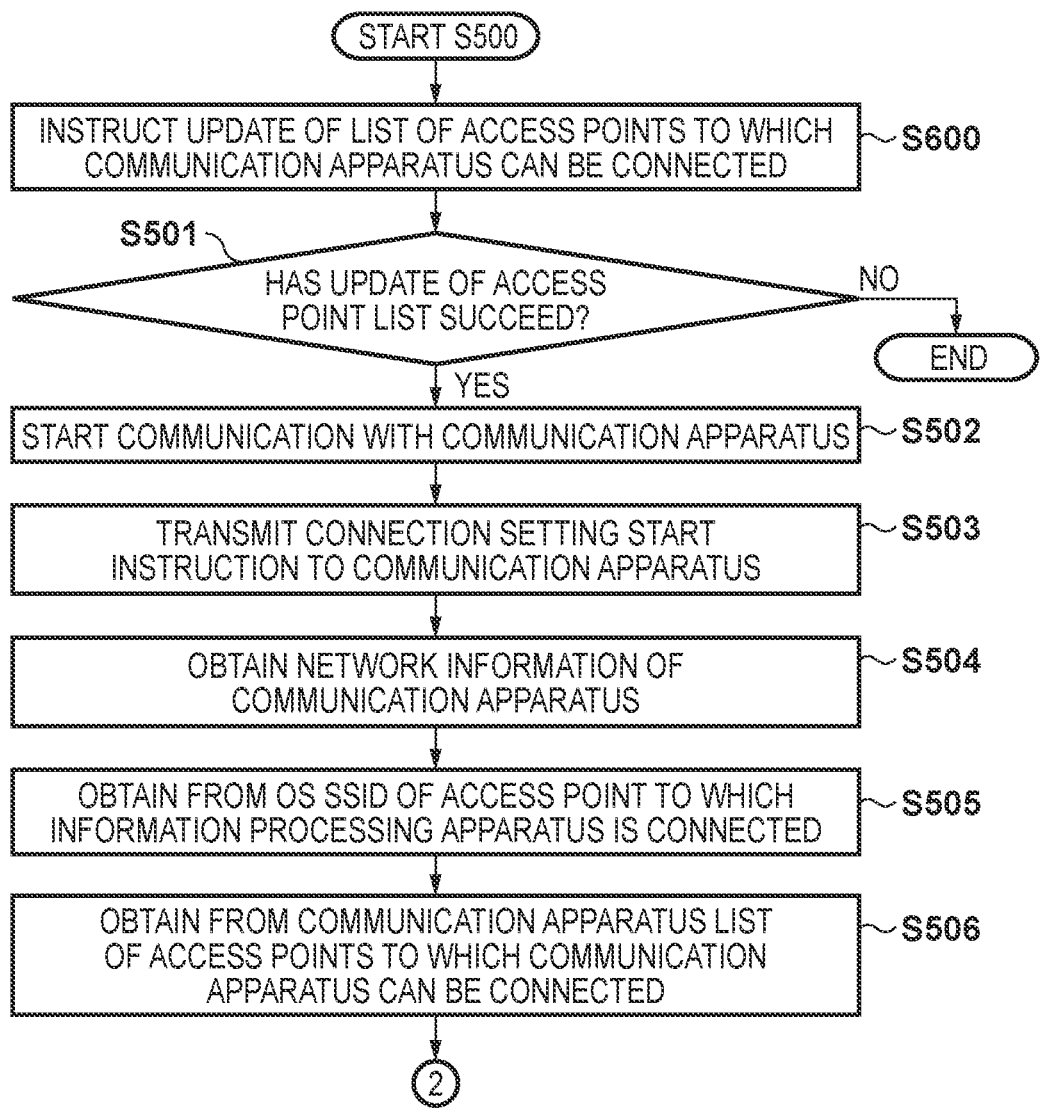

Wi-Fi setting processing of step S500 described above will be described next with reference to FIGS. 5A and 5B.

First, in step S600, the CPU 103 establishes Wi-Fi connection between the communication apparatus 151 and the information processing apparatus 101. More specifically, since the communication apparatus 151 in the connection setting mode enables a predetermined internal access point, the CPU 103 establishes Wi-Fi connection between the predetermined internal access point and the information processing apparatus 101. After that, the CPU 103 requests a list of external access points to which the communication apparatus 151 can be Wi-Fi-connected from the communication apparatus 151. The external access points to which the communication apparatus 151 can be Wi-Fi-connected are external access points that exist around the communication apparatus 151 and can be Wi-Fi-connected using a frequency band handled by the communication apparatus 151. The list requested at this time is a list of information used to identify the external access points to which the communication apparatus 151 can be Wi-Fi-connected. The information used to identify an external access point is, for example, an SSID (Service Set Identifier). To update the list, the communication apparatus 151 temporarily cancels the Wi-Fi connection between the communication apparatus 151 and the information processing apparatus 101. Note that details of the process of step S600 will be described later. Additionally, in step S600, determination information representing whether updating of the access point list has succeeded is stored in the RAM 105, as will be described later.

Next, the CPU 103 advances the process to step S501 to determine whether the updating of the list of external access points to which the communication unit 156 can be connected has succeeded. At this time, the CPU 103 performs the determination by reading out the determination information held in the RAM 105 in step S600. Upon determining that the updating has succeeded (YES in step S501), the CPU 103 advances the process to step S502 to start communication with the communication apparatus 151. Note that at this time, since the Wi-Fi connection between the communication apparatus 151 and the information processing apparatus 101 has been canceled, the CPU 103 establishes Wi-Fi connection again in step S502. On the other hand, upon judging that the updating has failed (NO in step S501), the CPU 103 ends the processing. In one example, upon judging that the updating has failed, error display is performed, and the processing shown in FIGS. 3A and 3B are ended.

In step S503, the CPU 103 transmits a Wi-Fi setting processing start instruction to the communication apparatus 151 by the communication started in step S502.

Next, the process advances to step S504, and the CPU 103 acquires network information from the communication apparatus 151 of the connection setting target by the communication established in step S502. Here, identification information (the MAC address of the communication apparatus 151, or the like) used to detect the communication apparatus 151 via the access point 131 is stored in the network information. Note that here, the identification information is stored in the network information acquired in step S504. However, the identification information may be stored in the information acquired in step S302 and S303. Additionally, the identification information may be stored in response data transmitted from the communication apparatus 151 in response to the communication start request transmitted in step S502.

Next, the CPU 103 advances the process to step S505 to acquire the identification information (here, the SSID) of the access point 131 to which the information processing apparatus 101 was Wi-Fi-connected at the time of connection setting processing start instruction. In one example, the CPU 103 acquires the identification information from the operating system (OS) installed in the information processing apparatus 101. Note that the information of the access point 131 to which the information processing apparatus 101 was Wi-Fi-connected at the time of connection setting processing start instruction is acquired from the access point 131 by the OS before the information processing apparatus 101 and the communication apparatus 151 are connected in step S600. For this reason, in other words, the access point 131 to which the information processing apparatus 101 was Wi-Fi-connected at the time of connection setting processing start instruction is the access point 131 to which the information processing apparatus 101 was connected before connection to the communication apparatus 151. The information of the access point 131 to which the information processing apparatus 101 was Wi-Fi-connected at the time of connection setting processing start instruction may be acquired from, for example, a beacon of Wi-Fi standard generated by the access point 131. The information may be acquired by inquiring of the access point 131 after the acquisition of the beacon and establishment of Wi-Fi connection. Note that the information of the access point 131 to which the information processing apparatus 101 was Wi-Fi-connected at the time of connection setting processing start instruction need not always be acquired from the OS, and may be acquired by, for example, inquiring of the access point 131 by the CPU 103.

Next, the CPU 103 advances the process to step S506 to acquire the list of access points to which the communication unit 156 can be connected from the communication apparatus 151 via the communication started in step S502.

Next, the CPU 103 advances the process to step S507 in FIG. 5B to determine whether the access point 131 to which the information processing apparatus 101 was Wi-Fi-connected at the time of connection setting processing start instruction exists in the list of external access points to which the communication apparatus 151 can be Wi-Fi-connected. This determination is performed based on the information of the list of external access points to which the communication apparatus 151 can be Wi-Fi-connected, which is acquired in step S600, and the identification information of the access point 131, which is acquired in step S506. Upon determining that the access point 131 exists in the list (YES in step S507), the CPU 103 advances the process to step S508. On the other hand, upon determining that the access point 131 does not exist in the list (NO in step S507), the CPU 103 advances the process to step S514. Note that a case in which the access point 131 does not exist in the list is, for example, a case in which the frequency band usable by the communication apparatus 151 and the frequency band that the access point 131 is using are different.

Figure 7:
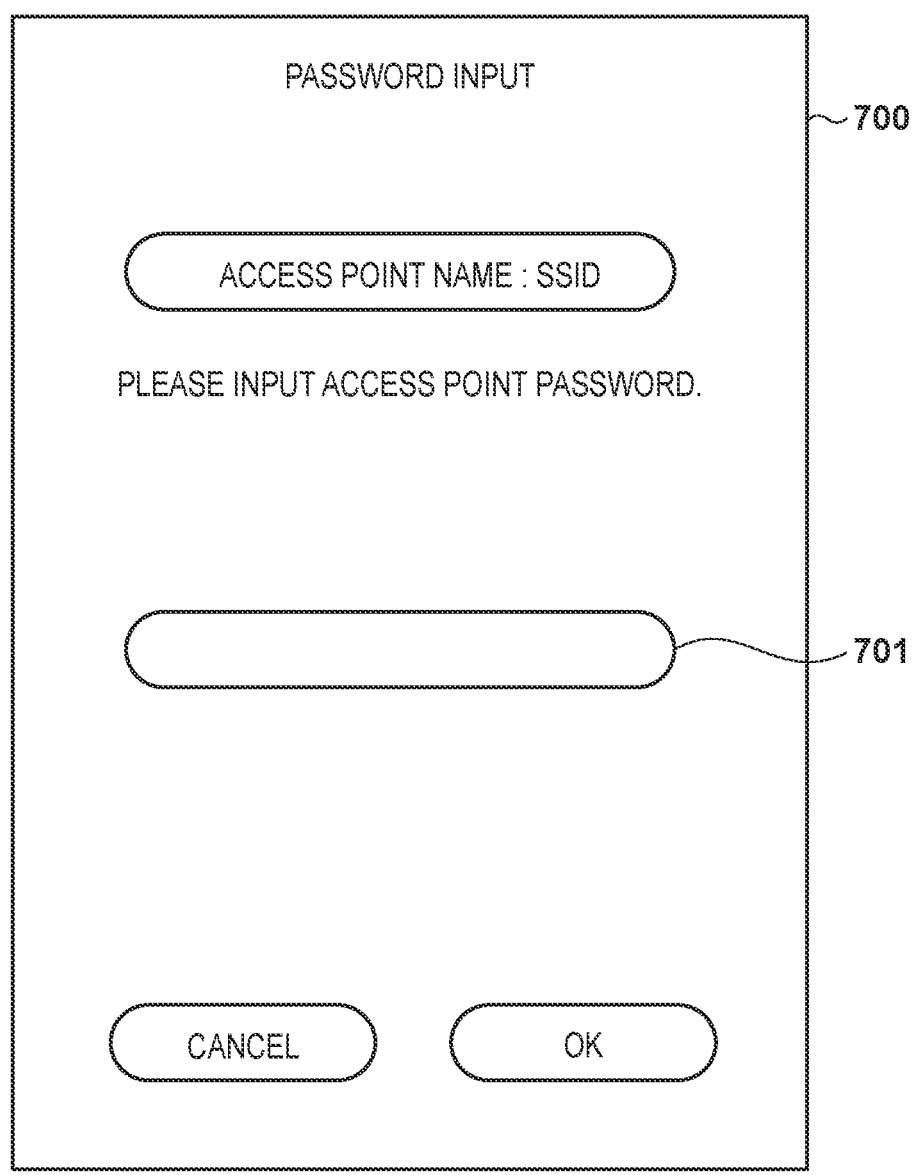
FIG. 7 is a view showing an example of a password input screen according to the embodiment.

In step S508, the CPU 103 displays the SSID acquired in step S505, and displays, on the display unit 108, an input screen for a password used to connect an access point (here, the access point 131) corresponding to the SSID. At this time, for example, a screen 700 shown in FIG. 7 is displayed as the password input screen. Next, the CPU 103 advances the process to step S509 to receive, from the user, input of the password used to connect the access point 131. At this time, the CPU 103 acquires password information input by the user to an input portion 701.

Next, the process advances to step S510, and the CPU 103 transmits, to the communication apparatus 151, connection setting information used to connect the communication apparatus 151 and the access point 131 to which the information processing apparatus 101 was Wi-Fi-connected at the time of connection setting processing start instruction. Here, the SSID of the access point 131, the password used to connect the access point 131, a command used to set the connection mode of the communication apparatus 151, and the like are stored in the connection setting information. Note that in this embodiment, the command used to set the connection mode of the communication apparatus 151 is a command used to set the infrastructure connection mode to the communication apparatus 151. Upon receiving the connection setting information, the communication apparatus 151 is connected to the access point 131. Note that at this time, if the communication apparatus 151 is already connected to the access point 131, the processing of connecting the access point 131 need not be executed anew. That is, if the communication apparatus 151 is not connected to any access point, or if the communication apparatus 151 is connected to an access point other than the access point 131, the processing of connecting the access point 131 may be executed.

Next, the CPU 103 advances the process to step S511 to determine whether the connection between the communication apparatus 151 and the access point 131 has succeeded by the transmitted connection setting information. More specifically, in step S511, the CPU 103 waits for reception of a notification from the communication apparatus 151 concerning success/failure of the connection between the communication apparatus 151 and the access point 131. Upon receiving the notification, the CPU 103 analyzes the contents of the notification and determines whether the connection between the communication apparatus 151 and the access point 131 has succeeded. Note that the notification may be received via the Wi-Fi connection between the information processing apparatus 101 and the communication apparatus 151, or if BLE connection is already established between the information processing apparatus 101 and the communication apparatus 151, the notification may be received via the BLE connection.

Upon determining that the connection between the communication apparatus 151 and the access point 131 has failed (NO in step S511), the CPU 103 advances the process to step S512. Upon determining that the connection between the communication apparatus 151 and the access point 131 has succeeded (YES in step S511), the CPU 103 establishes the connection between the access point 131 and the information processing apparatus 101 again and ends the Wi-Fi setting processing in step S500.

In step S512, the CPU 103 displays, on the display unit 108, a screen configured to confirm with the user whether to retry the establishment of the connection between the communication apparatus 151 and the access point 131.

The CPU 103 advances the process to step S513 to determine, based on the user input to the screen, whether to retry the establishment of the connection between the communication apparatus 151 and the access point 131. If the establishment of the connection between the communication apparatus 151 and the access point 131 should be retried (YES in step S513), the CPU 103 returns the process to step S508 to receive input of a password anew. This is because input of a wrong password may have led to the failure of the connection between the communication apparatus 151 and the access point 131. If the establishment of the connection between the communication apparatus 151 and the access point 131 should not be retried (NO in step S513), the CPU 103 ends the processing. In one example, if the establishment of the connection between the communication apparatus 151 and the access point 131 should not be retried (NO in step S513), the CPU 103 may perform error display.

The process of step S514, which is processing performed in a case in which it is determined that the access point 131 does not exist in the list (NO in step S507), will be described. In step S514, the CPU 103 displays, on the display unit 108, the list of external access points to which the communication apparatus 151 can be Wi-Fi-connected, which is acquired from the communication apparatus 151 in step S506, and receives selection of an access point in the list from the user.

Next, the CPU 103 advances the process to step S515 to display the SSID of the access point selected in step S514, and displays, on the display unit 108, an input screen for a password needed to use the access point corresponding to the SSID. At this time, for example, the screen 700 shown in FIG. 7 is displayed as the password input screen, as in the process of step S508.

The processes of steps S516 to S520 are the same as the processes of steps S509 to S513 described above except that the access point to be connected to the communication apparatus 151 is not the access point 131 but the access point selected in step S514, and a description thereof will be omitted.

As described above, if the access point 131 exists among the external access points to which the communication apparatus 151 can be Wi-Fi-connected, the information processing apparatus 101 need not receive the operation of selecting the access point to be connected to the communication apparatus 151 from the plurality of access points. This allows the user to easily execute the connection setting processing.

Note that a form in which the list of access points used in step S507 and the like is the list of external access points to which the communication apparatus 151 can be Wi-Fi-connected has been described above. However, the form is not limited to this. For example, the list may be the list of external access points to which the information processing apparatus 101 can be Wi-Fi-connected. In this case, the CPU 103 need not acquire the list from the communication apparatus 151.

The contents of the access point list updating processing of step S600 will be described next with reference to FIG. 6.

Figure 6:
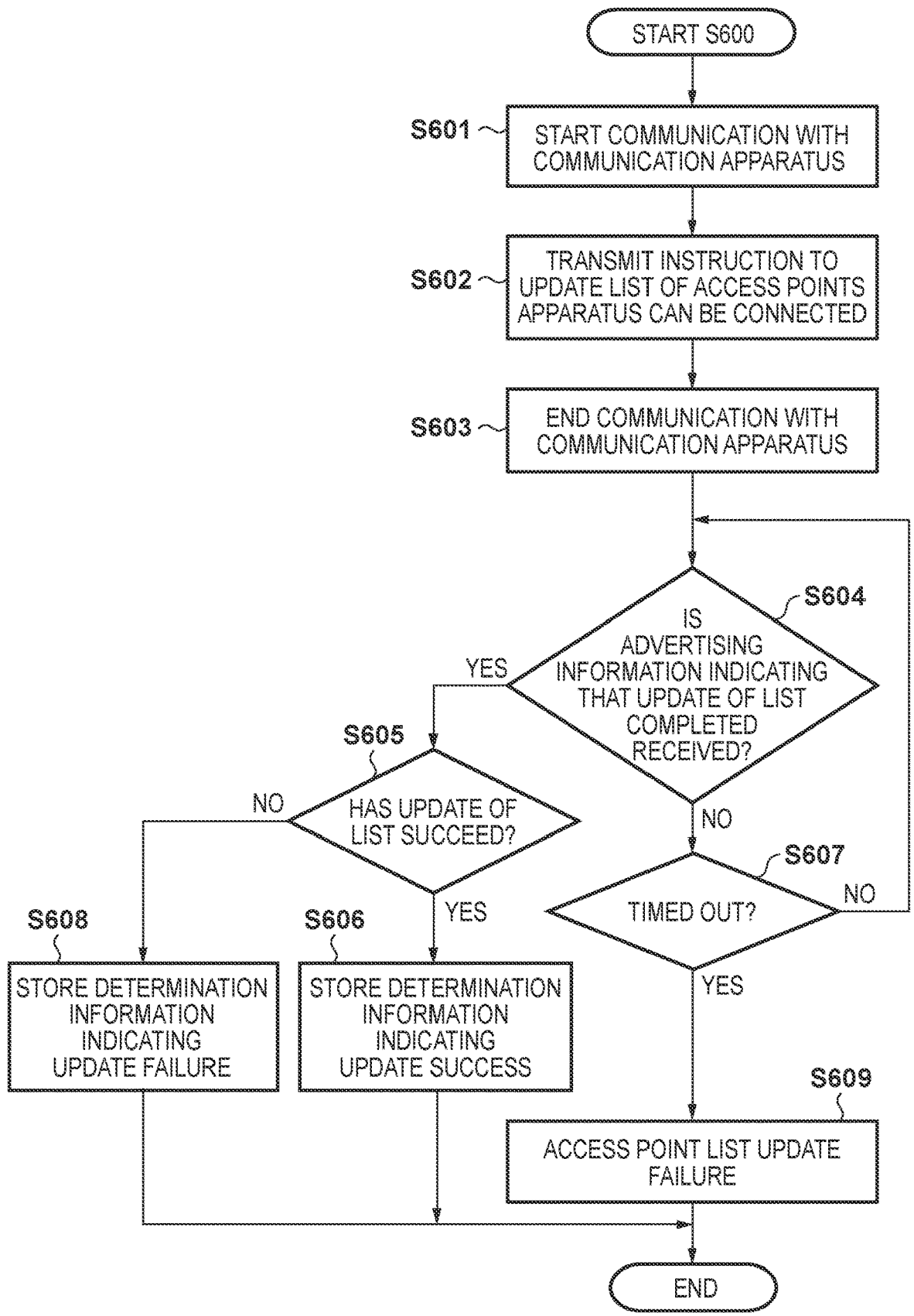
FIG. 6 is a flowchart showing an example of access point list updating processing executed by the information processing apparatus according to the embodiment.

FIG. 6 is a flowchart showing the procedure of the process of step S600. The flowchart shown in FIG. 6 is implemented when, for example, the CPU 103 reads out a program stored in the ROM 104, the external storage device 106, or the like to the RAM 105 and executes the program.

First, in step S601, the CPU 103 transmits a communication start request to the communication apparatus 151. When the communication apparatus 151 receives the communication start request, communication is started between the communication apparatus 151 and the information processing apparatus 101.

Next, the CPU 103 advances the process to step S602 to transmit an updating instruction for the list of external access points to which the communication apparatus 151 can be Wi-Fi-connected to the communication apparatus 151 via the Wi-Fi connection. Note that at this time, if BLE connection is already established between the communication apparatus 151 and the information processing apparatus 101, the updating instruction may be transmitted via the BLE connection. Next, the process advances to step S603, and the CPU 103 cancels the Wi-Fi connection between the communication apparatus 151 and the information processing apparatus 101 and ends the communication. Upon receiving the updating instruction, the communication apparatus 151 searches for external access points to which the communication apparatus 151 can be Wi-Fi-connected, and generates the information of the list. More specifically, the communication apparatus 151 starts receiving a beacon generated by an external access point that exists around the communication apparatus 151 and uses a frequency band usable by the communication apparatus 151. A list of thus acquired beacon sources is specified as the list of external access points to which the communication apparatus 151 can be Wi-Fi-connected.

Next, the CPU 103 advances the process to step S604 to determine whether updating information representing whether updating of the list of external access points to which the communication apparatus 151 can be Wi-Fi-connected has succeeded is received. The CPU 103 may receive the updating information by, for example, advertisement information of BLE transmitted from the communication apparatus 151, or may establish Wi-Fi connection between the communication apparatus 151 and the information processing apparatus 101 again and receive the updating information by the Wi-Fi connection. Upon determining that the updating information is received (YES in step S604), the CPU 103 advances the process to step S605. Upon determining that the updating information is not received (NO in step S604), the CPU 103 advances the process to step S607.

In step S605, the CPU 103 determines, based on the updating information, whether the updating of the list of external access points to which the communication apparatus 151 can be Wi-Fi-connected has succeeded. Upon determining that the updating of the list of external access points to which the communication apparatus 151 can be Wi-Fi-connected has succeeded (YES in step S605), the CPU 103 performs the process of step S606. On the other hand, upon determining that the updating of the list of external access points to which the communication apparatus 151 can be Wi-Fi-connected has not succeeded (NO in step S605), the CPU 103 performs the process of step S608.

In step S606, the CPU 103 stores, in the RAM 105, determination information representing that the updating of the list of external access points to which the communication apparatus 151 can be Wi-Fi-connected has succeeded.

Step S607 that is processing performed in a case in which it is determined in step S604 that the updating information is not received will be described. In step S607, the CPU 103 determines whether a predetermined time has elapsed from the transmission of the updating instruction for the list of access points (time-out has occurred). Upon determining that time-out has not occurred (NO in step S607), the CPU 103 returns the process to step S604. On the other hand, upon determining that time-out has occurred (YES in step S607), the CPU 103 advances the process to step S608.

In step S608, the CPU 103 stores, in the RAM 105, determination information representing that the updating of the list of external access points to which the communication apparatus 151 can be Wi-Fi-connected has failed. Note that in step S607, the CPU 103 may display, on the display unit 108, a screen to notify the user of the time-out. The determination information is used in the above-described determination processing.

As described above, in the connection setting processing S500, the processing of updating the list of access points to which the communication apparatus 151 can be connected is executed first, thereby more reliably connecting the communication apparatus 151 to the access point.

The procedure of registration processing of step S800 will be described at last with reference to FIG. 8. The flowchart shown in FIG. 8 is implemented when, for example, the CPU 103 reads out a program stored in the ROM 104, the external storage device 106, or the like to the RAM 105 and executes the program.

First, in the process of step S801, it is determined whether the access point 131 to which the information processing apparatus 101 is connected matches the access point corresponding to the information included in the connection setting information transmitted to the communication apparatus 151 in step S510. Upon determining that the access points do not match (NO in step S801), the CPU 103 advances the process to step S802. Upon determining that the access points match (YES in step S801), the CPU 103 advances the process to step S803.

In step S802, the CPU 103 switches the connection destination of the communication unit 111 to the access point corresponding to the information included in the connection setting information transmitted to the communication apparatus 151 in step S510. Since the information processing apparatus 101 and the communication apparatus 151 are connected to the same access point, the information processing apparatus 101 and the communication apparatus 151 can be infrastructure-connected.

In step S803, the CPU 103 searches for the communication apparatus 151 of the connection setting target belonging to the network formed by the external access point to which the information processing apparatus 101 is Wi-Fi-connected. More specifically, the CPU 103 broadcasts, onto the network formed by the external access point, information (for example, the identification information of the communication apparatus 151 of the connection setting target) used to obtain a response from the communication apparatus 151 of the connection setting target. The CPU 103 receives a response, thereby discovering the communication apparatus 151 of the connection setting target.

In step S804, the CPU 103 registers the communication apparatus 151 in the print application as the apparatus of the communication target. More specifically, the CPU 103 acquires, from the communication apparatus 151, the information of the capability of the communication apparatus 151. The information of the capability of the communication apparatus 151 includes, for example, information concerning a printing material usable by the communication apparatus 151, information concerning a print medium usable by the communication apparatus 151, the identification information of the communication apparatus 151, and the like. The CPU 103 holds these pieces of information for the print application, thereby registering the communication apparatus 151 in the print application. From then on, an instruction such as a print instruction can be transmitted to the communication apparatus 151 using the print application.

Note that in this embodiment, in the process of step S803, the communication apparatus 151 as the registration target is specified without a user operation, and the specified communication apparatus 151 is registered. However, the form is not limited to this. The communication apparatus of the registration target may be specified by displaying, on the display unit 108, a list screen including a list of a plurality of communication apparatuses 151 belonging to the network formed by the external access point to which the information processing apparatus 101 is Wi-Fi-connected and receiving, from the user, a selection operation from the list.

When the communication apparatus 151 as the target of connection setting is registered in the information processing apparatus 101 in this way, the information processing apparatus 101 can perform high-speed communication by wireless LAN with the infrastructure-connected communication apparatus 151.

As described above, according to this embodiment, it is possible to improve user convenience when performing authentication processing for a communication apparatus capable of communicating using a plurality of connection methods.

Other Embodiments

In the first embodiment, communication apparatuses are detected by a plurality of communication methods, and after the detection, which one of the detected communication apparatuses should be subjected to connection setting processing is determined based on user selection. In one example, the information processing apparatus may execute connection setting processing as soon as a communication apparatus is detected. Such an embodiment can shorten the time until execution of connection setting processing in a case in which it is considered that one communication apparatus is detected, for example, in a case in which the information processing apparatus detects a communication apparatus using NFC. In this case, the information processing apparatus 101 may detect a communication apparatus using one wireless communication method, and if a communication apparatus is detected, start connection setting processing. If a communication apparatus is not detected, the information processing apparatus 101 may detect a communication apparatus by another wireless communication method.

In the first embodiment, when executing the process of step S500, the communication apparatus 151 is instructed to update the list of external access points. However, if it is considered that the communication apparatus 151 already holds the list of external access points and, for example, if the communication apparatus 151 is detected via an external access point, updating of the access point list need not be instructed. That is, the process of step S600 in FIG. 5A may be omitted.

In the first embodiment, the information processing apparatus 101 transmits connection setting information or an updating instruction to the communication apparatus 151 via Wi-Fi connection. However, the form is not limited to this. For example, in a state in which BLE connection is already established (for example, a state after step S312), connection setting information or an updating instruction may be transmitted to the communication apparatus 151 via the BLE connection. In this case, the connection setting information may include, for example, identification information that is not the identification information of the access point 131 to which the information processing apparatus 101 was Wi-Fi-connected at the time of connection setting processing start instruction. More specifically, the connection setting information may include the identification information of the access point 131 to which the information processing apparatus 101 is Wi-Fi-connected at the time of transmission of connection setting information. This is because in a form in which connection setting information is transmitted via BLE connection, the information processing apparatus 101 can be Wi-Fi-connected to the access point 131 at the time of transmission of connection setting information.

In the first embodiment, as the Wi-Fi setting processing, the information processing apparatus 101 Wi-Fi-connects the communication apparatus 151 and an external access point. However, the form is not limited to this. For example, as the Wi-Fi setting processing, the information processing apparatus 101 may Wi-Fi-connect the information processing apparatus 101 and the communication apparatus 151 directly without an intervention of an external access point. More specifically, for example, at the time of Wi-Fi setting processing, if the information processing apparatus 101 is not connected to any external access point, the information processing apparatus 101 and the communication apparatus 151 may be Wi-Fi-connected directly without an intervention of an external access point. In this case, connection setting information does not include information concerning an external access point, and includes instruction information used to make the communication apparatus 151 transition to a direct connectable state.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-039811, filed Mar. 5, 2019, which is hereby incorporated by reference herein in its entirety.

What is claimed is:

1. A control method of a computer of an information processing apparatus capable of performing communication using a first communication method and a second communication method in which a communicable distance is shorter than in the first communication method, comprising:

searching for, by the first communication method, at least one communication apparatus capable of executing communication by the first communication method;

searching for, by the second communication method, the at least one communication apparatus capable of executing communication by the second communication method;

receiving a selection operation of selecting, as the communication apparatus of a connection setting target, one of the at least one communication apparatus discovered by the search using the first communication method and the at least one communication apparatus discovered by the search using the second communication method; and if the communication apparatus of the connection setting target is selected by the selection operation from the at least one communication apparatus discovered by the search using the first communication method, transmitting first setting information used to cause the communication apparatus of the connection setting target to establish connection by the first communication method to the communication apparatus of the connection setting target by the first communication method, and based on the transmission of the first setting information, transmitting second setting information used to cause the communication apparatus of the connection setting target to establish connection by the second communication method to the communication apparatus of the connection setting target, and if the communication apparatus of the connection setting target is selected by the selection operation from the at least one communication apparatus discovered by the search using the second communication method, transmitting the second setting information to the communication apparatus of the connection setting target by the second communication method, and based on the transmission of the second setting information, transmitting the first setting information to the communication apparatus of the connection setting target.

2. The method according to claim 1, wherein the first setting information includes information used to cause the communication apparatus of the connection setting target to establish connection by the first communication method with an external apparatus outside the information processing apparatus and outside the communication apparatus.

3. The method according to claim 2, wherein the first setting information includes information used to cause the communication apparatus of the connection setting target to establish connection by the first communication method with the external apparatus to which the information processing apparatus was connected upon receiving the selection operation.

4. The method according to claim 2, wherein if the information processing apparatus was connected to the external apparatus upon receiving the selection operation, the first setting information includes information used to cause the communication apparatus of the connection setting target to establish connection by the first communication method with the external apparatus to which the information processing apparatus was connected upon receiving the selection operation, and
    if the information processing apparatus was not connected to the external apparatus upon receiving the selection operation, the first setting information includes information used to cause the communication apparatus of the connection setting target to establish connection by the first communication method with the information processing apparatus without an intervention of the external apparatus.

5. The method according to claim 2, further comprising acquiring a list of at least one external apparatus to which the communication apparatus can be connected,
    wherein if the external apparatus to which the information processing apparatus was connected upon receiving the selection operation is included in the list, the first setting information includes information used to establish connection by the first communication method with the external apparatus to which the information processing apparatus was connected upon receiving the selection operation, and
    if the external apparatus to which the information processing apparatus was connected upon receiving the selection operation is not included in the list, the first setting information includes information used to establish connection by the first communication method with an external apparatus selected from the list.

6. The method according to claim 2, wherein the first setting information includes at least one of identification information of the external apparatus and a password used to connect the external apparatus.

7. The method according to claim 2, wherein the search of the at least one communication apparatus by the first communication method includes a first search that is a search of the at least one communication apparatus belonging to a network formed by the external apparatus to which the information processing apparatus is connected by the first communication method, and a second search that is a search of the at least one communication apparatus in a state in which connection without an intervention of the external apparatus can be executed by the first communication method,
    if the communication apparatus of the connection setting target is selected by the selection operation from the at least one communication apparatus discovered by the first search, the first setting information is not transmitted to the communication apparatus of the connection setting target by the first communication method, and the second setting information is transmitted to the communication apparatus of the connection setting target, and
    if the communication apparatus of the connection setting target is selected by the selection operation from the at least one communication apparatus discovered by the second search, the first setting information is transmitted to the communication apparatus of the connection setting target by the first communication method, and based on the transmission of the first setting information, the second setting information is transmitted to the communication apparatus of the connection setting target.

8. The method according to claim 1, wherein the second setting information includes information used to cause the communication apparatus of the connection setting target to establish connection by the second communication method with the information processing apparatus.

9. The method according to claim 1, wherein the second setting information includes information used to execute pairing processing based on the second communication method between the communication apparatus of the connection setting target and the information processing apparatus.

10. The method according to claim 1, further comprising, if the communication apparatus of the connection setting target is selected by the selection operation from the at least one communication apparatus discovered by the search using the first communication method, receiving, from a user, an input concerning whether to transmit the second setting information to the communication apparatus of the connection setting target based on the transmission of the first setting information,
    wherein if an input representing transmitting the second setting information to the communication apparatus of the connection setting target is received, the second setting information is transmitted to the communication apparatus of the connection setting target, and
    if the input representing transmitting the second setting information to the communication apparatus of the connection setting target is not received, the second setting information is not transmitted to the communication apparatus of the connection setting target.

11. The method according to claim 1, wherein the selection operation is received by a list screen parallelly including the at least one communication apparatus discovered by the search using the first communication method and the at least one communication apparatus discovered by the search using the second communication method.

12. The method according to claim 11, wherein in the list screen, the at least one communication apparatus discovered by the search using the first communication method and the at least one communication apparatus discovered by the search using the second communication method are displayed such that the at least one communication apparatus discovered by the search using the first communication method and the at least one communication apparatus discovered by the search using the second communication method can be distinguished.

13. The method according to claim 11, wherein the search of the at least one communication apparatus by the first communication method includes a first search that is a search of the at least one communication apparatus belonging to a network formed by an external apparatus outside the information processing apparatus and outside the communication apparatus, to which the information processing apparatus is connected by the first communication method, and a second search that is a search of the at least one communication apparatus in a state in which connection without an intervention of the external apparatus can be executed by the first communication method, and the at least one communication apparatus discovered by the search using the first communication method is displayed such that the at least one communication apparatus discovered by the first search and the at least one communication apparatus discovered by the second search can be distinguished.

14. The method according to claim 1, wherein the first communication method is Wi-Fi®.

15. The method according to claim 1, wherein the second communication method is Bluetooth®.

16. The method according to claim 15, wherein the second communication method is Bluetooth Low Energy®.

17. The method according to claim 1, further comprising, after the first setting information and the second setting information are transmitted, executing at least one of processing of transmitting a print job used to execute printing to the communication apparatus of the connection setting target by the first communication method and processing of communicating information used to establish connection by the first communication method between the communication apparatus of the connection setting target and the information processing apparatus to the communication apparatus of the connection setting target by the second communication method.

18. The method according to claim 1, wherein if the communication apparatus of the connection setting target is selected by the selection operation from the at least one communication apparatus discovered by the search using the first communication method, the second setting information is transmitted to the communication apparatus of the connection setting target without receiving, from a user, an operation of selecting a transmission destination of the second setting information after the transmission of the first setting information.

19. The method according to claim 1, wherein if the communication apparatus of the connection setting target is selected by the selection operation from the at least one communication apparatus discovered by the search using the second communication method, the first setting information is transmitted to the communication apparatus of the connection setting target without receiving, from a user, an operation of selecting a transmission destination of the first setting information after the transmission of the second setting information.

20. An information processing apparatus capable of performing communication using a first communication method and a second communication method in which a communicable distance is shorter than in the first communication method, comprising:

a first search unit configured to search for, by the first communication method, at least one communication apparatus capable of executing communication by the first communication method;

a second search unit configured to search for, by the second communication method, the at least one communication apparatus capable of executing communication by the second communication method;

a receiving unit configured to receive a selection operation of selecting, as the communication apparatus of a connection setting target, one of the at least one communication apparatus discovered by the search using the first communication method and the at least one communication apparatus discovered by the search using the second communication method; and a transmission unit configured to, if the communication apparatus of the connection setting target is selected by the selection operation from the at least one communication apparatus discovered by the search using the first communication method, transmit first setting information used to cause the communication apparatus of the connection setting target to establish connection by the first communication method to the communication apparatus of the connection setting target by the first communication method, and based on the transmission of the first setting information, transmit second setting information used to cause the communication apparatus of the connection setting target to establish connection by the second communication method to the communication apparatus of the connection setting target, and if the communication apparatus of the connection setting target is selected by the selection operation from the at least one communication apparatus discovered by the search using the second communication method, transmit the second setting information to the communication apparatus of the connection setting target by the second communication method, and based on the transmission of the second setting information, transmit the first setting information to the communication apparatus of the connection setting target.

* * * * *